(12) United States Patent
Jeong et al.

(10) Patent No.: US 12,299,248 B2
(45) Date of Patent: May 13, 2025

(54) DISPLAY DEVICE

(71) Applicant: LG Display Co., Ltd., Seoul (KR)

(72) Inventors: Seongwoong Jeong, Paju-si (KR); Geonwoo Lee, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/532,545

(22) Filed: Dec. 7, 2023

(65) Prior Publication Data

US 2024/0192821 A1 Jun. 13, 2024

(51) Int. Cl.
*G06F 3/041* (2006.01)
*G06F 3/044* (2006.01)
*G06F 3/045* (2006.01)

(52) U.S. Cl.
CPC ............ *G06F 3/045* (2013.01); *G06F 3/0412* (2013.01); *G06F 3/04164* (2019.05); *G06F 3/0446* (2019.05); *G06F 2203/04111* (2013.01)

(58) Field of Classification Search
CPC ...... G06F 3/044; G06F 3/0445; G06F 3/0446; G06F 3/04164
See application file for complete search history.

(56) References Cited

U.S. PATENT DOCUMENTS

| | | | |
|---|---|---|---|
| 2013/0271675 A1* | 10/2013 | Misaki | G02F 1/13338 345/173 |
| 2014/0071064 A1* | 3/2014 | Cho | G06F 3/0443 345/173 |
| 2020/0012387 A1 | 1/2020 | Kim et al. | |
| 2020/0083299 A1* | 3/2020 | Kim | H10K 50/844 |
| 2021/0096674 A1* | 4/2021 | Zhang | G06F 3/047 |
| 2021/0191550 A1* | 6/2021 | Wang | G06F 3/0446 |
| 2021/0200406 A1* | 7/2021 | Lee | G06F 3/04164 |
| 2021/0200407 A1* | 7/2021 | Jang | G06F 3/0446 |
| 2022/0179519 A1* | 6/2022 | Hsu | G06F 3/0446 |

FOREIGN PATENT DOCUMENTS

KR 10-2020-0005707 A 1/2020

* cited by examiner

*Primary Examiner* — Yuzhen Shen
(74) *Attorney, Agent, or Firm* — Morgan, Lewis & Bockius LLP

(57) ABSTRACT

A display device may include an active area and a non-active area; a touch sensing structure disposed in the active area and including touch electrodes; touch pads disposed in the non-active area and electrically connected to the touch electrodes; and touch link lines connecting the touch pads and the touch electrodes and disposed in the non-active area. The touch electrodes and the touch pads may be disposed along the same one direction. At least a portion of at least one of the touch link lines may have a zigzag shape. The touch link lines disposed in the non-active area may have equal resistance by having different configurations or shapes of the touch link lines.

33 Claims, 7 Drawing Sheets

DISPLAY DEVICE

CROSS-REFERENCE TO RELATED APPLICATIONS

This application claims the benefit of and priority to Korean Patent Application No. 10-2022-0170787 filed on Dec. 8, 2022, the entirety of which is incorporated herein by reference for all purposes.

BACKGROUND

1. Technical Field

The present disclosure relates to a display device, and particularly to, for example, without limitation, a display device capable of preventing exterior defects in which spots are visually recognized in a non-active area.

2. Discussion of the Related Art

Recently, as our society advances toward an information-oriented society, the display technologies for visually expressing an electrical information signal have rapidly evolved. Various display devices having superior performance, for example, having a slim profile, lightweight, and low power consumption, are being developed correspondingly.

Representative display devices may include a liquid crystal display device (LCD), a field emission display device (FED), an electro-wetting display device (EWD), an organic light emitting display device (OLED), and the like.

An electroluminescent display device, such as an organic light emitting display device, is a self-luminous display device and, unlike a liquid crystal display device, does not require a separate light source and can be manufactured to be lightweight and slim. In addition, the electroluminescent display device has advantages in terms of power consumption due to a low voltage driving, and is superior in terms of color rendering, response speed, viewing angle, and contrast ratio (CR). Therefore, electroluminescent display devices are expected to be utilized in various fields.

The description provided in the discussion of the related art section should not be assumed to be prior art merely because it is mentioned in or associated with that section. The discussion of the related art section may include information that describes one or more aspects of the subject technology, and the description in this section does not limit the invention.

SUMMARY

One or more aspects of the present disclosure are to provide a display device capable of designing touch link lines disposed in a non-active area to have equal resistance by having different configurations or shapes of the touch link lines disposed in the non-active area.

Other one or more aspects of the present disclosure are to provide a display device capable of preventing exterior defects in which spots are visually recognized in a non-active area.

Still other one or more aspects of the present disclosure are to provide a display device capable of increasing a degree of freedom in adjusting a resistance-capacitance (RC) value by designing touch link lines disposed in a non-active area in parallel.

Aspects and objects of the present disclosure are not limited to the above-mentioned aspects and objects, and other aspects and objects, which are not mentioned above, can be clearly understood by those skilled in the art from the description herein.

A display device according to one or more example embodiments of the present disclosure may include a substrate; an active area and a non-active area; a plurality of light emitting elements disposed in the active area; an encapsulation structure disposed to cover the plurality of light emitting elements; a touch sensing structure, wherein at least a portion of the touch sensing structure may be disposed on the encapsulation structure, and wherein the touch sensing structure may include a plurality of touch electrodes; a plurality of touch pads disposed in the non-active area and configured for electrical connection to the plurality of touch electrodes; and a plurality of touch link lines connecting the plurality of touch pads and the plurality of touch electrodes and disposed in the non-active area, wherein the plurality of touch electrodes may be disposed along one direction, the plurality of touch pads may be disposed along the one direction, and at least a portion of at least one of the plurality of touch link lines may have a zigzag shape.

One or more further example embodiments are provided in this disclosure, including the drawings.

In a display device according to one or more example embodiments of the present disclosure, one or more touch link lines may have a zigzag shape, and one or more other touch link lines may be configured not to include a zigzag shape, so that the touch link lines disposed in the non-active area may have equal resistance.

In a display device according to one or more example embodiments of the present disclosure, one or more touch link lines may have a first width, and one or more other touch link lines may have a second width different from the first width, so that the touch link lines disposed in the non-active area may have equal resistance.

In a display device according to one or more example embodiments of the present disclosure, the touch link lines may be configured with different widths, different lengths, and/or different shapes so that the touch link lines disposed in the non-active area may have equal resistance.

In a display device according to one or more example embodiments of the present disclosure, by configuring touch link lines disposed in a central portion where a density of the touch link lines is relatively low in a non-active area, in parallel, a width of touch link lines disposed in a corner portion where a density of the touch link lines is relatively high in the non-active area may be configured to be equal to a width of the touch link lines disposed in the central portion. Thus, it is possible to prevent occurrence of spots due to reflective visibility caused by a difference in metal exposure area between the touch link lines in the central portion and the corner portion of the non-active area.

In a display device according to one or more example embodiments of the present disclosure, by designing touch link lines disposed in a central portion of a non-active area in parallel, parallel resistance of the touch link lines can be freely adjusted, so that a degree of freedom in adjusting an RC value can be increased.

In a display device according to one or more example embodiments of the present disclosure, parts of touch link lines disposed in a central portion of a non-active area may be designed to have a single line having a zigzag shape, and the other parts thereof may be configured to be disposed in parallel, so that the touch link lines disposed in the non-active area can be designed with equal resistance.

The effects according one or more example embodiments of the present disclosure are not limited to those described herein, and other additional effects may be realized and attained by the descriptions provided in the present disclosure. Further, other devices, methods, features and advantages will be, or will become, apparent to one with skill in the art upon examination of the drawings and detailed description herein. It is intended that all such devices, methods, features and advantages be included within this description, be within the scope of the present disclosure, and be protected by the following claims. Nothing in this section should be taken as a limitation on the claims. Further aspects and advantages are discussed below in conjunction with embodiments of the disclosure.

It is to be understood that both the foregoing description and the following description of the present disclosure are exemplary and explanatory, and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate aspects and embodiments of the disclosure, and together with the description serve to explain principles and examples of the disclosure.

Figure 1:
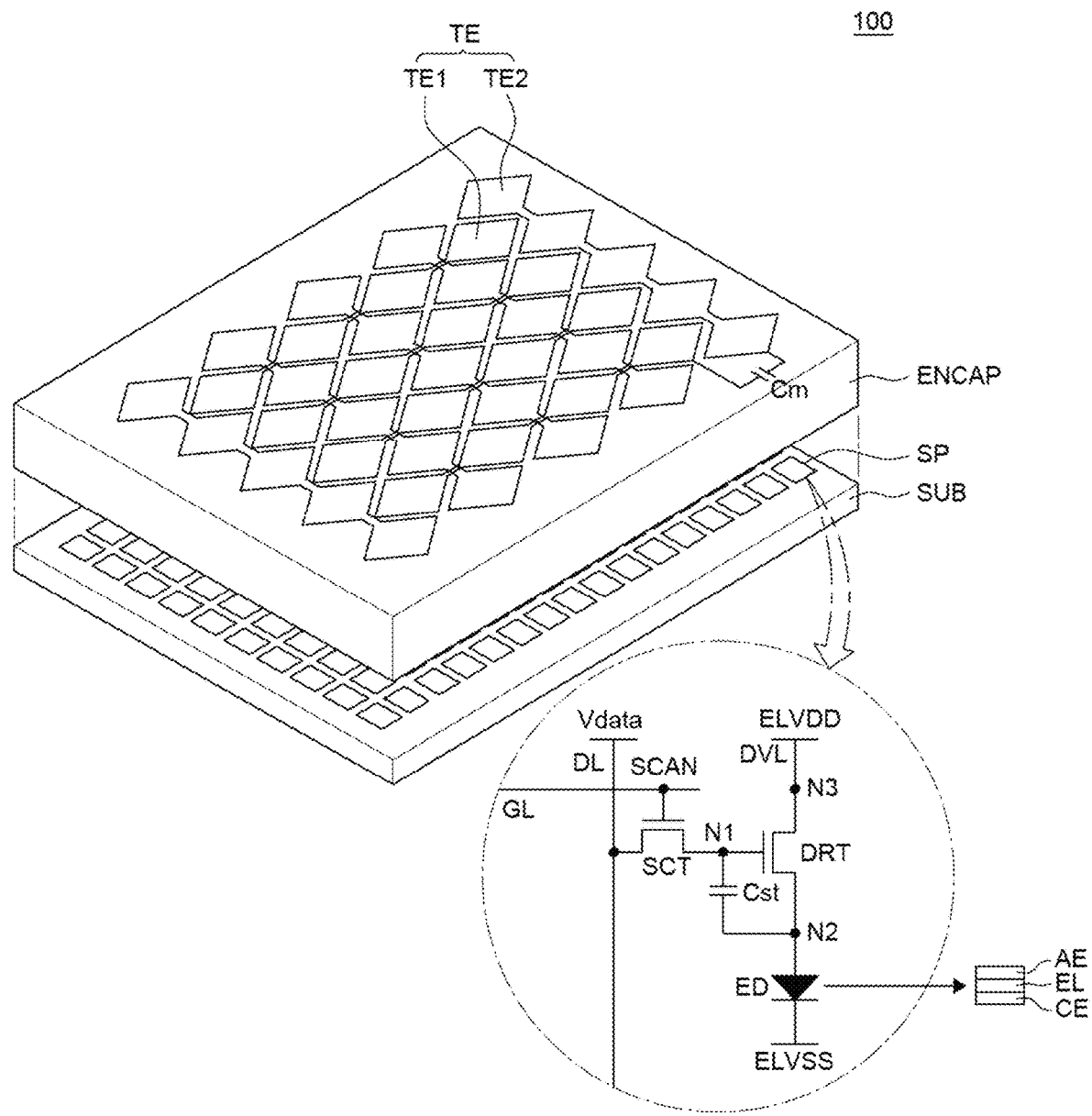
FIG. 1 is a schematic perspective view of a display device according to an example embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and convenience.

DETAILED DESCRIPTION

Reference is now made in detail to embodiments of the present disclosure, examples of which may be illustrated in the accompanying drawings. In the following description, when a detailed description of well-known methods, functions, structures or configurations may unnecessarily obscure aspects of the present disclosure, the detailed description thereof may have been omitted for brevity. Further, repetitive descriptions may be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the embodiments described with reference to the accompanying drawings. The present disclosure may, however, be embodied in different forms and should not be construed as limited to the embodiments set forth herein. Rather, these embodiments are examples and are provided so that this disclosure may be thorough and complete to assist those skilled in the art to understand the inventive concepts without limiting the protected scope of the present disclosure.

Shapes, dimensions (e.g., sizes, lengths, widths, heights, thicknesses, locations, radii, diameters, and areas), ratios, angles, numbers, the number of elements, and the like disclosed herein, including those illustrated in the drawings, are merely examples, and thus, the present disclosure is not limited to the illustrated details. It is, however, noted that the relative dimensions of the components illustrated in the drawings are part of the present disclosure.

When the term "comprise," "have," "include," "contain," "constitute," "made of," "formed of," "composed of," or the like is used with respect to one or more elements, one or more other elements may be added unless a term such as "only" or the like is used. The terms used in the present disclosure are merely used in order to describe particular example embodiments, and are not intended to limit the scope of the present disclosure. The terms of a singular form may include plural forms and vice versa unless the context clearly indicates otherwise. The word "exemplary" is used to mean serving as an example or illustration. Embodiments are example embodiments. Aspects are example aspects. "Embodiments," "examples," "aspects," and the like should not be construed to be preferred or advantageous over other implementations. An embodiment, an example, an example embodiment, an aspect, or the like may refer to one or more embodiments, one or more examples, one or more example embodiments, one or more aspects, or the like, unless stated otherwise. Further, the term "may" encompasses all the meanings of the term "can."

In one or more aspects, unless explicitly stated otherwise, an element, feature, or corresponding information (e.g., a level, range, dimension, size, or the like) is construed to include an error or tolerance range even where no explicit description of such an error or tolerance range is provided. An error or tolerance range may be caused by various factors (e.g., process factors, internal or external impact, noise, or the like). In interpreting a numerical value, the value is interpreted as including an error range unless explicitly stated otherwise.

In describing a positional relationship, where the positional relationship between two elements (e.g., layers, films, regions, components, sections, or the like) is described, for example, using "on," "upon," "on top of," "over," "under," "above," "below," "beneath," "near," "close to," "adjacent to," "beside," "next to," "at or on a side of" or the like, one or more other elements may be located between the two elements unless a more limiting term, such as "immediate(ly)," "direct(ly)," or "close(ly)," is used. For example, when an element is described as being positioned "on," "on a top of," "upon," "on top of," "over," "under," "above," "below," "beneath," "near," "close to," "adjacent to," "beside," "next to," or "at or on a side of" another element, this description should be construed as including a case in which the elements contact each other directly as well as a case in which one or more additional elements are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, can include all directions of "above" and "below." Likewise, an exemplary term "above" or "on" can include both directions of "above" and "below."

In describing a temporal relationship, when the temporal order is described as, for example, "after," "subsequent," "next," "before," "preceding," "prior to," or the like, a case that is not consecutive or not sequential may be included and thus one or more other events may occur therebetween, unless a more limiting term, such as "just," "immediate(ly)," or "direct(ly)," is used.

It is understood that, although the terms "first," "second," and the like may be used herein to describe various elements (e.g., layers, films, regions, components, sections, or the like), these elements should not be limited by these terms, for example, to any particular order, precedence, or number of elements. These terms are used only to distinguish one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element, and the like) are not limited by ordinal numbers or the names in front of the elements. Further, a first element may include one or more first elements. Similarly, a second element or the like may include one or more second elements or the like.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

For the expression that an element (e.g., layer, film, component, unit, line, electrode, material, structure, or the like) is "connected," "coupled," "attached," "adhered," or the like to another element, the element can not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e.g., layer, film, component, unit, line, electrode, material, structure, or the like) "contacts," "overlaps," or the like with another element, the element can not only directly contact, overlap, or the like with another element, but also indirectly contact, overlap, or the like with another element with one or more intervening elements disposed or interposed between the elements, unless otherwise specified.

The phrase that an element (e.g., layer, film, component, unit, line, electrode, material, structure, or the like) is "provided in," "disposed on," "disposed in," or the like in another element may be understood as that at least a portion of the element is provided in, disposed on, disposed in, or the like in another element, or that the entirety of the element is provided in, disposed on, disposed in, or the like in another element. The phrase "through" may be understood to be at least partially through or entirely through. The phrase that an element (e.g., layer, film, component, unit, line, electrode, material, structure, or the like) "contacts," "overlaps," or the like with another element may be understood as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element. The phrase that an element (e.g., layer, film, component, unit, line, electrode, material, structure, process, or the like) is "configured by" another element may be understood as that the element is configured with, configured using, implemented with, or implemented using another element.

The terms such as a "line" or "direction" should not be interpreted only based on a geometrical relationship in which the respective lines or directions are parallel or perpendicular to each other, and may be meant as lines or directions having wider directivities within the range within which the components of the present disclosure can operate functionally. For example, the terms "first direction," "second direction," and the like, such as the terms "horizontal axis direction," "vertical axis direction," "X-axis direction," "Y-axis direction," and "Z-axis direction," should not be interpreted only based on a geometrical relationship in which the respective directions are parallel or perpendicular to each other, and may be meant as directions having wider directivities within the range within which the components of the present disclosure can operate functionally.

The term "at least one" should be understood as including any and all combinations of one or more of the associated listed items. For example, each of the phrases "at least one of a first item, a second item, or a third item" and "at least one of a first item, a second item, and a third item" may represent (i) a combination of items provided by two or more of the first item, the second item, and the third item or (ii) only one of the first item, the second item, or the third item. Further, at least one of a plurality of elements can represent (i) one element of the plurality of elements, (ii) some elements of the plurality of elements, or (iii) all elements of the plurality of elements. Further, one or more elements of a plurality of elements can represent (i) one element of the plurality of elements, (ii) some elements of the plurality of elements, or (iii) all elements of the plurality of elements. Further, the term "some" may represent, for example, (i) one or (ii) more than one. Further, some parts (or at least some parts, or at least some elements) of the plurality of elements can represent, for example, (i) one element of the plurality of elements, (ii) multiple elements of the plurality of elements, or (iii) all of the plurality of elements. Further, a part (or at least a part) of a plurality of elements can represent, for example, (i) one element or a portion of the plurality of elements, (ii) multiple elements of the plurality of elements, or (iii) all of the plurality of elements. Further, parts, at least parts or at least some of a plurality of elements can represent, for example, (i) one element or a portion of the plurality of elements, (ii) multiple elements of the plurality of elements, or (iii) all of the plurality of elements. Further, at least one or more parts of a plurality of elements can represent, for example, (i) one element or a portion of the plurality of elements, (ii) multiple elements of the plurality of elements, or (iii) all of the plurality of elements. A phrase that a plurality of first elements are connected to a plurality of second elements may describe, for example, that at least a part (or one or more first elements) of a plurality of first elements are connected to at least a part (or one or more second elements) of a plurality of second elements.

The expression of a first element, a second elements "and/or" a third element should be understood as one of the first, second and third elements or as any or all combinations of the first, second and third elements. By way of example, A, B and/or C may refer to only A; only B; only C; any of A, B, and C (e.g., A, B, or C); some combination of A, B, and C (e.g., A and B; A and C; or B and C); or all of A, B, and C. Furthermore, an expression "A/B" may be understood as A and/or B. For example, an expression "A/B" may refer to only A; only B; A or B; or A and B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two. Furthermore, when an element (e.g., layer, film, component, unit, line, electrode, material, structure, or the like) is referred to as being "between" at least two elements, the element may be the only element between the at least two elements, or one or more intervening elements may also be present.

In one or more aspects, the phrases "each other" and "one another" may be used interchangeably simply for convenience unless stated otherwise. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise. In one or more aspects, unless stated otherwise, the term "n-th" or "nth" may refer to "nnd" (e.g., 2nd where n is 2), or "nrd" (e.g., 3rd where n is 3), and n may be a natural number.

The term "or" means "inclusive or" rather than "exclusive or." That is, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

Features of various embodiments of the present disclosure may be partially or entirely coupled to or combined with each other, may be technically associated with each other, and may be variously operated, linked or driven together in various ways. Embodiments of the present disclosure may be implemented or carried out independently of each other or may be implemented or carried out together in a co-dependent or related relationship. In one or more aspects, the components of each apparatus and device according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example embodiments.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

In the following description, various example embodiments of the present disclosure are described in detail with reference to the accompanying drawings. With respect to reference numerals to elements of each of the drawings, the same elements may be illustrated in other drawings, and like reference numerals may refer to like elements unless stated otherwise. The same or similar elements may be denoted by the same reference numerals even though they are depicted in different drawings. In addition, for convenience of description, a scale, dimension, size, and thickness of each of the elements illustrated in the accompanying drawings may be different from an actual scale, dimension, size, and thickness, and thus, embodiments of the present disclosure are not limited to a scale, dimension, size, and thickness illustrated in the drawings.

FIG. 1 is a schematic perspective view of a display device 100 according to an example embodiment of the present disclosure.

Figure 3:
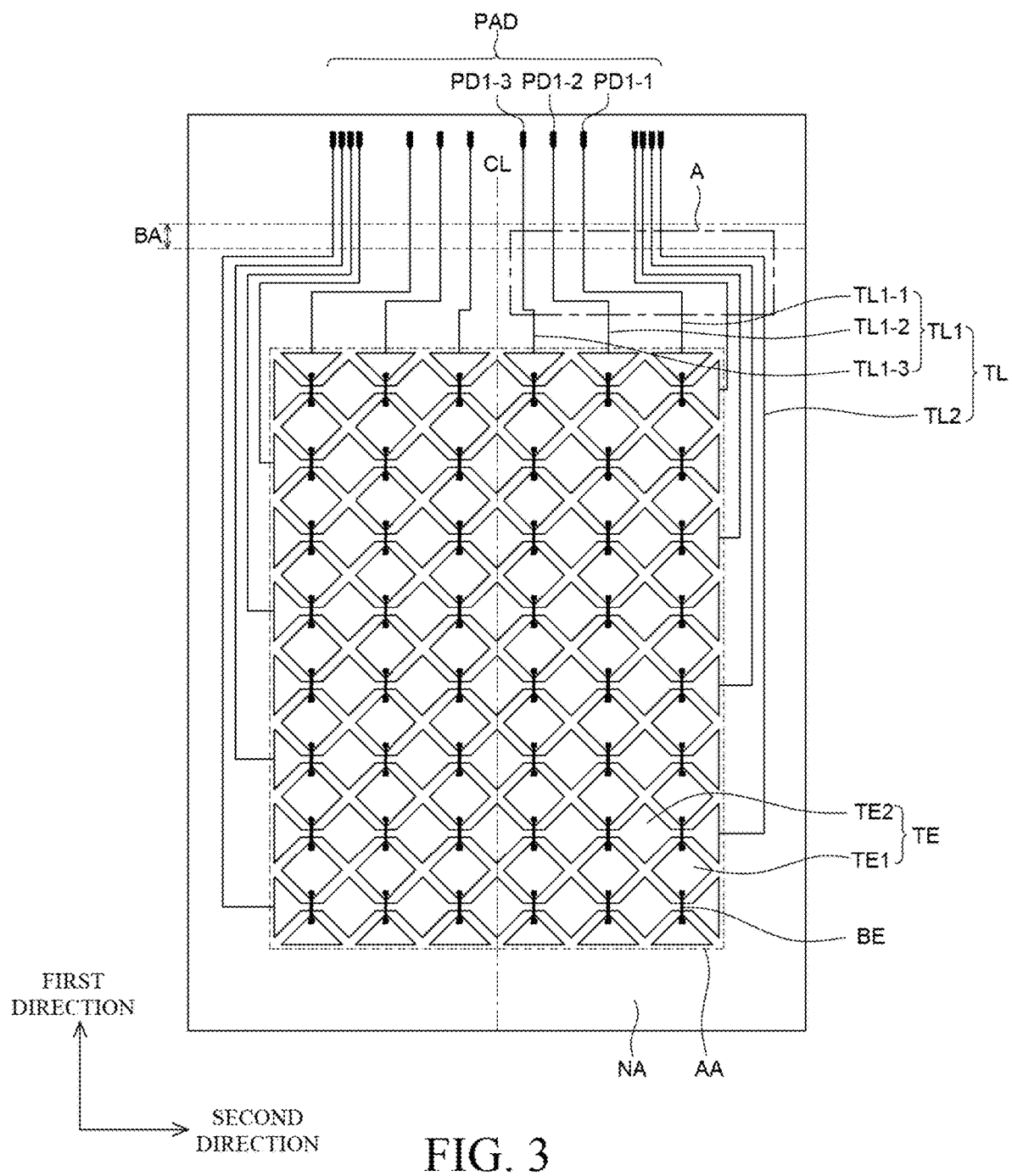
FIG. 3 is a plan view schematically illustrating a display device according to an example embodiment of the present disclosure.

The display device 100 according to an example embodiment of the present disclosure includes an active area AA and a non-active area NA (see, e.g., FIG. 3). The display device 100 includes a substrate SUB, a plurality of sub-pixels SP arranged in a matrix form on or in the active area AA, an encapsulation unit ENCAP disposed on (or in or at) the plurality of sub-pixels SP, and touch sensors (or touch electrodes) TE disposed on the encapsulation unit ENCAP.

The substrate SUB is a component for supporting various components included in the display device 100 and may be formed of an insulating material. The substrate SUB may be formed of a transparent insulating material such as glass or resin. In addition, the substrate SUB may be formed to include a polymer or plastic, or may be formed of a material having flexibility.

Although not illustrated, a plurality of gate lines and a plurality of data lines are disposed to intersect each other on the substrate SUB. The plurality of sub-pixels SP are defined at intersections of the plurality of gate lines and data lines. An area, in which the plurality of sub-pixels SP for generating or displaying an image are disposed, may be understood as the active area AA, and an area, which is disposed outside the active area AA and in which the plurality of sub-pixels SP are not disposed, may be understood as the non-active area NA.

The active area AA is an area for displaying an image, and the display device 100 according to an example embodiment of the present disclosure displays an image through or using the sub-pixels SP including light emitting elements ED. The sub-pixels SP may include red (R), green (G), and blue (B) sub-pixels SP, or red (R), green (G), blue (B), and white (W) sub-pixels SP.

The non-active area NA is an area in which an image is not displayed and in which various lines and circuits for driving display units disposed in the active area AA are disposed. The non-active area NA may be bent and not visible from the front of the display device 100, or may be covered by a case (not illustrated), and may be referred to as a bezel area.

The non-active area NA may be defined as an area surrounding the active area AA. However, the present disclosure is not limited thereto, and the non-active area NA may be defined as an area extending from the active area AA. Also, the non-active area NA may be defined as extending from a plurality of sides of the active area AA.

In the non-active area NA, various integrated circuits (ICs) such as gate driver ICs and data driver ICs and chip on films (COFs) or flexible printed circuit boards (FPCBs) in which driving circuits are provided may be disposed. In addition, a driving circuit referred to as a gate in panel (GIP), a ground line GRL (see, e.g., FIGS. 4 and 7), or the like may be disposed in the non-active area NA.

For example, the non-active area NA may include the ground line GRL that is disposed to surround the active area DA and configured to apply a common voltage to the sub-pixels. For example, at least one or two or more ground lines GRL may be formed.

For example, a pad area may be disposed in the non-active area NA, and pads connected to various signal lines or a printed circuit board are disposed in the pad area. For example, a bending area may be further included between the active area AA and the pad area in the non-active area NA. The bending area may be bent so that the pad area may be located on a rear surface of the substrate SUB, but the present disclosure is not limited thereto.

Figure 2:
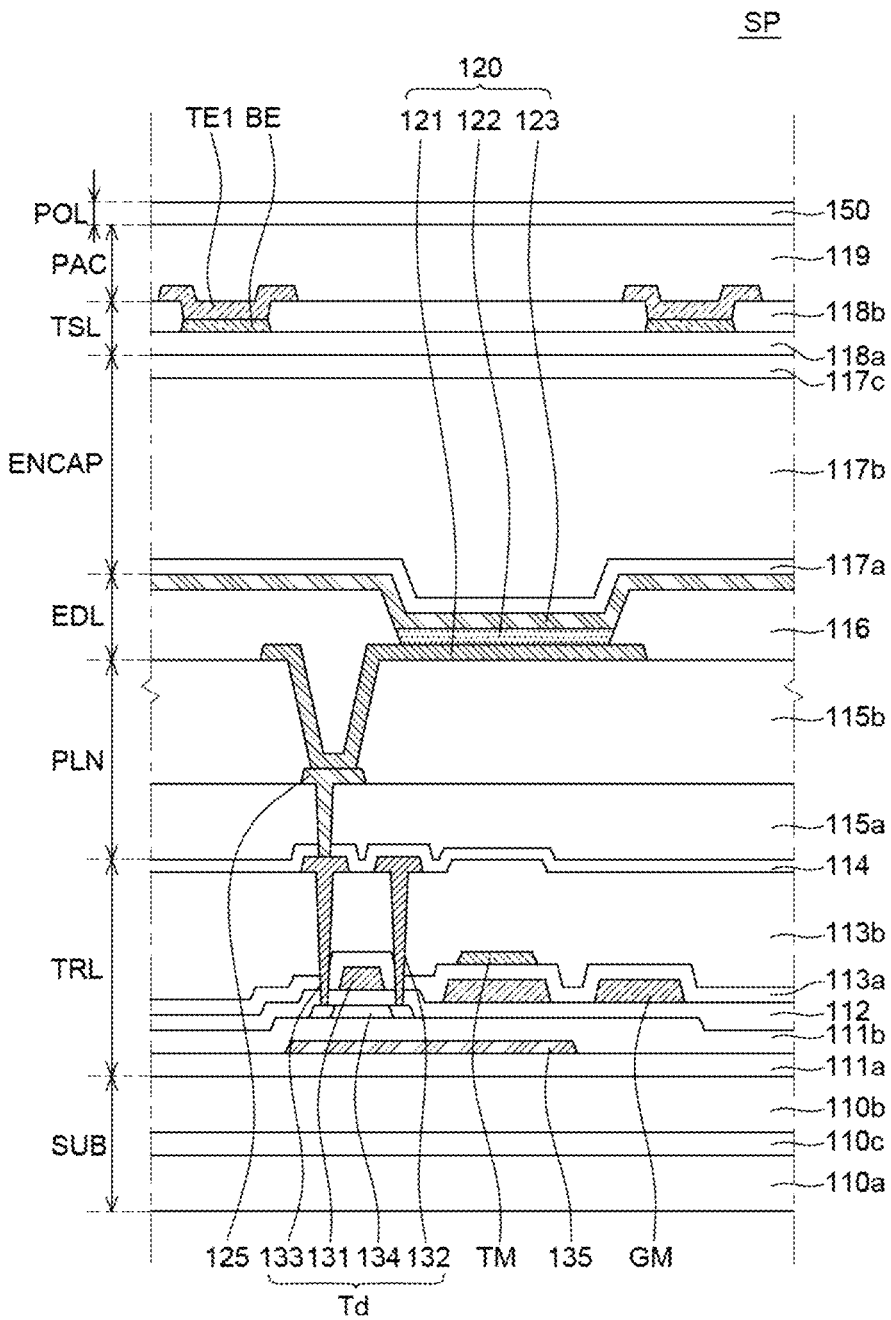
FIG. 2 is a schematic cross-sectional view illustrating one pixel area according to an example embodiment of the present disclosure.

According to an example embodiment of the present disclosure, the display device 100 having the touch sensors senses whether a touch has been made or not and a position of the touch by detecting a variation in mutual capacitance (Cm; touch sensor) due to a user's touch through a plurality of the touch electrodes TE illustrated in FIGS. 1 and 2 during a touch period.

Each of the sub-pixels SP disposed in the active area AA of the substrate includes a pixel driving circuit and the light emitting element ED connected to the pixel driving circuit.

The pixel driving circuit may include a driving transistor DRT, a scan transistor SCT for transmitting a data voltage VDATA to a first node N1 of the driving transistor DRT, a storage capacitor Cst for maintaining a constant voltage for one frame, and the like.

The driving transistor DRT may include the first node N1 to which the data voltage can be applied, a second node N2 electrically connected to the light emitting element ED, and a third node N3 to which a driving voltage ELVDD is applied from a driving voltage line DVL. In the driving transistor DRT, the first node N1 may be a gate node, the second node N2 may be a source node or a drain node, and the third node N3 may be a drain node or a source node.

The light emitting element ED may include an anode electrode AE, an emission layer EL, and a cathode electrode CE. The anode electrode AE may be a pixel electrode disposed in each of the sub-pixels SP, and may be electrically connected to the second node N2 of the driving transistor DRT of each sub-pixel SP. The cathode electrode CE may be a common electrode commonly disposed in the plurality of sub-pixels SP, and a ground voltage ELVSS may be applied to the cathode electrode CE.

For example, the anode electrode AE may be a pixel electrode, and the cathode electrode CE may be a common electrode. Conversely, the anode electrode AE may be a common electrode, and the cathode electrode CE may be a pixel electrode. Hereinafter, for convenience of description, the anode electrode AE is considered to be a pixel electrode and the cathode electrode CE is considered to be a common electrode, for the purpose of illustration without limiting the scope of the present disclosure.

For example, the light emitting element ED may be an organic light emitting diode (OLED), an inorganic light emitting diode, or a quantum dot light emitting element. In this case, when the light emitting element ED is an organic light emitting diode, the emission layer EL of the light emitting element ED may include an organic emission layer containing an organic material.

An on/off of the scan transistor SCT may be controlled by a scan signal SCAN which is a gate signal applied through the gate line GL, and may be electrically connected between the first node N1 of the driving transistor DRT and the data line DL.

The storage capacitor Cst may be electrically connected between the first node N1 and the second node N2 of the driving transistor DRT.

According to an example embodiment of the present disclosure, since each sub-pixel SP of the display device 100 includes two transistors DRT and SCT and one capacitor Cst, it may be referred to as a two-transistor-one-capacitor (2T1C) structure. However, the sub-pixel SP of the display device 100 according to an example embodiment of the present disclosure is not limited thereto, and may be formed in various compensation structures such as a 4T2C structure including 4 transistors and 2 capacitors, a 5T2C structure including 5 transistors and 2 capacitors, a 6T2C structure including 6 transistors and 2 capacitors, and a 7T2C structure including 7 transistors and 2 capacitors.

The storage capacitor Cst is not a parasitic capacitor (e.g., Cgs or Cgd) that is an internal capacitor that may exist between the first node N1 and the second node N2 of the driving transistor DRT, but may be an external capacitor intentionally designed outside the driving transistor DRT.

Each of the driving transistor DRT and scan transistor SCT may be an n-type transistor or a p-type transistor.

Since circuit elements (in particular, the light emitting elements ED) in each of the sub-pixels SP are vulnerable to external moisture or oxygen, the encapsulation layer ENCAP for preventing permeation of external moisture or oxygen into the circuit elements (in particular, the light emitting elements ED) may be disposed on the substrate SUB. The encapsulation layer ENCAP may be disposed to cover the light emitting elements ED.

Hereinafter, a more detailed description of the display device 100 is provided with reference to FIGS. 2 and 3.

FIG. 2 is a schematic cross-sectional view illustrating one pixel area according to an example embodiment of the present disclosure. FIG. 3 is a plan view schematically illustrating the display device according to an example embodiment of the present disclosure.

In FIG. 3, only a touch sensing unit disposed on an encapsulation unit ENCAP among various components of the display device 100 is illustrated for convenience of description.

Referring to FIGS. 2 and 3, in the sub-pixel SP disposed in the active area AA, a transistor layer TRL may be disposed on the substrate SUB, and a planarization layer PLN may be disposed on the transistor layer TRL. In addition, a light emitting element layer EDL may be disposed on the planarization layer PLN, the encapsulation layer ENCAP may be disposed on the light emitting element layer EDL, a touch sensing layer TSL may be disposed on the encapsulation layer ENCAP, and a protective layer PAC may be disposed on the touch sensing layer TSL. In addition, a polarization layer POL may be disposed on the protective layer PAC.

The substrate SUB is a component for supporting various components included in the display device 100 and may be formed of an insulating material. The substrate SUB may include a first substrate 110a, a second substrate 110b, and an interlayer insulating layer 110c. The interlayer insulating layer 110c may be disposed between the first substrate 110a and the second substrate 110b. By configuring the substrate SUB with the first substrate 110a, the second substrate 110b, and the interlayer insulating layer 110c as described above, moisture permeation can be prevented. For example, the first substrate 110a and the second substrate 110b may be polyimide (PI) substrates.

In the transistor layer TRL in the active area AA, various patterns 131, 132, 133, and 134 for forming transistors such as the driving transistor Td, and the like, various insulating layers 111a, 111b, 112, 113a, 113b, and 114, and various metal patterns TM, GM, and 135 may be disposed.

Hereinafter, a stacked structure of the transistor layer TRL is described in more detail.

A multi-buffer layer 111a may be disposed on the second substrate 110b, and an active buffer layer 111b may be disposed on the multi-buffer layer 111a.

A metal layer 135 may be disposed on the multi-buffer layer 111a.

Here, the metal layer 135 may serve as a light shielding layer and may also be referred to as a light blocking layer.

The active buffer layer 111b may be disposed on the metal layer 135.

An active layer 134 of the driving transistor Td may be disposed on the active buffer layer 111b. For example, the active layer 134 may be formed of polysilicon (p-Si), amorphous silicon (a-Si), or an oxide semiconductor, but is not limited thereto.

A gate insulating layer 112 may be disposed on the active layer 134. The gate insulating layer 112 may be formed of silicon oxide (SiOx), silicon nitride (SiNx), or a double layer thereof.

In addition, a gate electrode 131 of the driving transistor Td may be disposed on the gate insulating layer 112. The gate electrode 131 is disposed on the gate insulating layer 112 to overlap the active layer 134. The gate electrode 131 may be formed of various conductive materials such as magnesium (Mg), aluminum (Al), nickel (Ni), chromium (Cr), molybdenum (Mo), tungsten (W), gold (Au), or alloys thereof, but the present disclosure is not limited thereto.

A gate material layer GM may be disposed on the gate insulating layer 112, at a position different from a position at which the driving transistor Td is formed.

A first interlayer insulating layer 113a may be disposed on the gate electrode 131 and the gate material layer GM. The metal pattern TM may be disposed on the first interlayer insulating layer 113a. A second interlayer insulating layer 113b may be disposed to cover the metal pattern TM disposed on the first interlayer insulating layer 113a.

A source electrode 132 and a drain electrode 133 of the driving transistor Td may be disposed on the second interlayer insulating layer 113b.

The source electrode 132 and the drain electrode 133 may be connected to one side and the other side of the active layer 134, respectively, through contact holes provided in the second interlayer insulating layer 113b, the first interlayer insulating layer 113a, and the gate insulating layer 112. The source electrode 132 and the drain electrode 133 may be formed of various conductive materials such as magnesium (Mg), aluminum (Al), nickel (Ni), chromium (Cr), molybdenum (Mo), tungsten (W), gold (Au) or an alloy thereof, but the present disclosure is not limited thereto.

A portion of the active layer 134 overlapping the gate electrode 131 is a channel region. One of the source electrode 132 and the drain electrode 133 is connected to one side of the channel region in the active layer 134 and the other thereof is connected to the other side of the channel region in the active layer 134.

A passivation layer 114 may be disposed on the source electrode 132 and the drain electrode 133. The passivation layer 114 serves to protect the driving transistor Td, and may be formed of an inorganic layer, for example, silicon oxide (SiOx), silicon nitride (SiNx), or a double layer thereof.

The planarization layer PLN may be positioned on the transistor layer TRL.

The planarization layer PLN may include a first planarization layer 115a and a second planarization layer 115b. The planarization layer PLN protects the driving transistor Td and planarizes an upper portion thereof.

The first planarization layer 115a may be disposed on the passivation layer 114.

A connection electrode 125 may be disposed on the first planarization layer 115a.

The connection electrode 125 may be connected to one of the source electrode 132 and the drain electrode 133 through a contact hole provided in the first planarization layer 115a.

The second planarization layer 115b may be disposed on the connection electrode 125.

The light emitting element layer EDL may be positioned on the second planarization layer 115b.

Hereinafter, a stacked structure of the light emitting element layer EDL is described in more detail.

An anode 121 may be disposed on the second planarization layer 115b. In this case, the anode 121 may be electrically connected to the connection electrode 125 through a contact hole provided in the second planarization layer 115b. The anode 121 may be formed of a metallic material.

When the display device 100 is a top emission type in which light emitted from a light emitting element 120 is emitted upwardly of the substrate SUB above which the light emitting element 120 is disposed, the anode 121 may further include a transparent conductive layer and a reflective layer on the transparent conductive layer. The transparent conductive layer may be formed of, for example, a transparent conductive oxide such as indium tin oxide (ITO) or indium zinc oxide (IZO), and the reflective layer may be formed of, for example, silver (Ag), aluminum (Al), gold (Au), molybdenum (Mo), tungsten (W), chromium (Cr), or alloys thereof.

A bank 116 may be disposed to cover the anode 121. A portion of the bank 116 corresponding to an emission area of the sub-pixel may be open. A portion of the anode 121 may be exposed through the open portion of the bank 116 (which may be referred to as an open area). In this case, the bank 116 may be formed of an inorganic insulating material such as silicon nitride (SiNx) or silicon oxide (SiOx) or an organic insulating material such as benzocyclobutene-based resin, acrylic resin, or imide-based resin, but the present disclosure is not limited thereto.

A light emitting layer 122 may be disposed on the open area of the bank 116 and a surrounding portion thereof. Accordingly, the light emitting layer 122 may be disposed on the anode 121 exposed through the open area of the bank 116.

A cathode 123 may be disposed on the light emitting layer 122.

The light emitting element 120 may be formed by the anode 121, the light emitting layer 122, and the cathode 123. The light emitting layer 122 may include a plurality of organic layers.

The encapsulation layer ENCAP may be positioned on the light emitting element layer EDL described above.

The encapsulation layer ENCAP may have a single-layer structure or a multilayer structure. For example, the encapsulation layer ENCAP may include a first encapsulation layer 117a, a second encapsulation layer 117b, and a third encapsulation layer 117c.

In this case, the first encapsulation layer 117a and the third encapsulation layer 117c may be formed of an inorganic layer, and the second encapsulation layer 117b may be formed of an organic layer. Among the first encapsulation layer 117a, the second encapsulation layer 117b, and the third encapsulation layer 117c, the second encapsulation layer 117b may be the thickest and may serve as a planarization layer.

The first encapsulation layer 117a may be disposed on the cathode 123 and may be disposed closest to the light emitting element 120. The first encapsulation layer 117a may be formed of an inorganic insulating material capable of low-temperature deposition. For example, the first encapsulation layer 117a may be formed of silicon nitride (SiNx), silicon oxide (SiOx), silicon oxynitride (SiON), or aluminum oxide ($Al_2O_3$). Since the first encapsulation layer 117a is deposited in a low-temperature atmosphere, it is possible to prevent damage to the light emitting layer 122 including an organic material vulnerable to a high-temperature atmosphere during a deposition process.

The second encapsulation layer 117b may have an area smaller than that of the first encapsulation layer 117a. In this case, the second encapsulation layer 117b may be formed to expose both ends of the first encapsulation layer 117a. The second encapsulation layer 117b may serve as a buffer to alleviate stress between respective layers due to bending of a flexible display device and serve to enhance planarization performance.

For example, the second encapsulation layer 117b may be formed of an organic insulating material such as acrylic resin, epoxy resin, polyimide, polyethylene, or silicon oxycarbon (SiOC). For example, the second encapsulation layer 117b may be formed using an inkjet method, but is not limited thereto.

The third encapsulation layer 117c may be formed to cover an upper portion and side surfaces of each of the second encapsulation layer 117b and the first encapsulation layer 117a above the substrate SUB above which the second encapsulation layer 117b is formed. In this case, the third encapsulation layer 117c may minimize or block penetration of external moisture or oxygen into the first encapsulation layer 117a and the second encapsulation layer 117b. For example, the third encapsulation layer 117c may be formed of an inorganic insulating material such as silicon nitride (SiNx), silicon oxide (SiOx), silicon oxynitride (SiON), or aluminum oxide ($Al_2O_3$).

The touch sensing layer TSL may be disposed on the encapsulation layer ENCAP described above.

Specifically, the touch sensing layer TSL may include a touch buffer layer 118a disposed on the encapsulation layer ENCAP, bridge electrodes BE disposed on the touch buffer layer 118a, a touch interlayer insulating layer 118b disposed on the touch buffer layer 118a and the bridge electrodes BE, and a plurality of touch electrodes TE disposed on the touch interlayer insulating layer 118b and including a plurality of first touches TE1 and a plurality of second touch electrodes TE2 crossing each other. For example, the touch electrodes TE or the bridge electrode BE may be configured in a mesh pattern, but is not limited thereto.

The touch buffer layer 118a may be formed to expose touch pads PAD in the non-active area NA and the display panel.

The touch buffer layer 118a may block a chemical solution such as a developing solution or an etchant used in a manufacturing process of touch electrodes formed on the touch buffer layer 118a, or external moisture or foreign materials from penetrating into the light emitting elements.

The plurality of touch electrodes TE may include the plurality of first touch electrodes TE1 extending in a first direction (e.g., a Y-axis direction) and the plurality of second touch electrodes TE2 extending in a second direction (e.g., an X-axis direction) crossing the first direction.

For example, the plurality of first touch electrodes TE1 and the plurality of second touch electrodes TE2 may be disposed on the same layer. However, in areas where the plurality of first touch electrodes TE1 and the plurality of second touch electrodes TE2 cross each other, the plurality of first touch electrodes TE1 may be disposed to be separate, and the plurality of separate first touch electrodes TE1 may be connected by the bridge electrodes BE. The touch interlayer insulating layer 118b may be disposed between the plurality of first touch electrodes TE1 and the bridge electrodes BE.

For example, the plurality of first touch electrodes TE1 connected by the bridge electrodes BE may extend in the first direction (e.g., a Y-axis direction). The plurality of first touch electrodes TE1 that are not connected by the bridge electrodes BE (e.g., TE1-1, TE1-2 and TE1-3 shown in FIG. 4 or FIG. 7) may be disposed sequentially along the second direction (e.g., an X-axis direction). In this example, first touch electrodes TE1-1, TE1-2 and TE1-3 are not connected to each other along the second direction.

In this case, the plurality of first touch electrodes TE1, the plurality of second touch electrodes TE2, and the bridge electrodes BE are disposed in the active area AA.

The non-active area NA may include a bending area BA in which the substrate SUB can be bent or folded.

A plurality of touch link lines TL and a plurality of touch pads PAD are disposed in the non-active area NA.

Portions of the plurality of touch pads PAD and the plurality of touch link lines TL may be bent by the bending area BA and positioned on the rear surface of the substrate SUB.

Each of the plurality of touch link lines TL electrically connects each of the plurality of touch electrodes TE disposed in the active area AA and the plurality of touch pads PAD disposed in the non-active area NA.

Specifically, the plurality of touch link lines TL may include a plurality of first touch link lines TL1 connecting the plurality of touch pads PAD and the plurality of first touch electrodes TE1 and disposed in a central portion of the non-active area NA, and a plurality of second touch link lines TL2 connecting the plurality of touch pads PAD and the plurality of second touch electrodes TE2 and disposed in a corner portion of the non-active area NA.

Specifically, touch driving signals may be applied to the plurality of first touch electrodes TE1 through the plurality of first touch link lines TL1 connected to the plurality of first touch electrodes TE1, and touch sensing signals may be applied to the plurality of second touch electrodes TE2 through the plurality of second touch link lines TL2 connected to the plurality of second touch electrodes TE2.

Each of the plurality of first touch link lines TL1 and the plurality of second touch link lines TL2 may be formed of a low-resistance metal material, but is not limited thereto.

The plurality of touch pads PAD may have one ends connected to the touch link lines TL and the other ends electrically connected to an external circuit such as a touch driver and receive touch signals from the external circuit or transmit the touch sensing signal to the external circuit.

In an example, a plurality of touch pads PAD may be disposed in the non-active area NA and electrically connected to the plurality of first touch electrodes TE1 and the plurality of second touch electrodes TE2. Further, a plurality of first touch link lines TL1 may connect the plurality of touch pads PAD and the plurality of first touch electrodes TE1 and may be disposed in a central portion of the non-active area NA. Further, a plurality of second touch link lines TL2 may connect the plurality of second touch electrodes TE2 and the plurality of touch pads PAD and may be disposed in a corner portion of the non-active area NA.

In this example, each pad of the plurality of touch pads PAD may be connected to a corresponding one of the plurality of first touch link lines TL1 or to a corresponding one of the plurality of second touch link lines TL2. Each line (see, e.g., TL1-1, TL1-2, or TL1-3 of FIG. 4 or FIG. 7) of the plurality of first touch link lines TL1 may be connected to corresponding one or more first touch electrodes TE1 (see, e.g., TE1-1, TE1-2, or TE1-3 of FIG. 4 or FIG. 7) of the plurality of first touch electrodes TE1. Each line of the plurality of second touch link lines TL2 may be connected to corresponding one or more second touch electrodes TE2 of the plurality of second touch electrodes TE2.

Accordingly, in this example, each pad of the plurality of touch pads PAD may be electrically connected to (i) corresponding one or more first touch electrodes TE1 of the plurality of first touch electrodes TE1 or (ii) corresponding one or more second touch electrodes TE2 of the plurality of second touch electrodes TE2.

Therefore, a phrase that a plurality of touch pads PAD are electrically connected to the plurality of first touch electrodes TE1 and the plurality of second touch electrodes TE2 may describe, for example, that at least some pads (or at least some parts) of a plurality of touch pads PAD are electrically connected to the plurality of first touch electrodes TE1, and at least some other pads (or at least some other parts) of the plurality of touch pads PAD are electrically connected to the plurality of second touch electrodes TE2. Further, a phrase that a plurality of first touch link lines TL1 connect the plurality of touch pads PAD and the plurality of first touch electrodes TE1 may describe, for example, that a plurality of first touch link lines TL1 connect the at least some pads (or the at least some parts) of the plurality of touch pads PAD and the plurality of first touch electrodes TE1. Further, a phrase that a plurality of second touch link lines TL2 connect the plurality of second touch electrodes TE2 and the plurality of touch pads PAD may describe, for example, that a plurality of second touch link lines TL2 connect the plurality of second touch electrodes TE2 and the at least some other pads (or the at least some other parts) of the plurality of touch pads PAD.

A protective layer PAC 119 may be disposed to cover the plurality of touch electrodes TE and the plurality of touch link lines TL. The protective layer 119 may be formed of an organic insulating layer.

A polarization layer (POL) 150 is disposed on the protective layer 119.

The polarization layer 150 suppresses reflection of external light on the active area AA of the substrate SUB. When the display device 100 is used externally, external natural light is introduced and reflected by the reflective layer included in the anode 121 of the light emitting element or by an electrode formed of a metal disposed under the light emitting element 120. An image of the display device 100 may not be viewed due to the reflected light. The polarization layer 150 polarizes light introduced from the outside in a specific direction and prevents the reflected light from being emitted to the outside of the display device 100 again.

Although not illustrated, a cover glass may be bonded to the polarization layer 150 by an adhesive layer. The adhesive layer may serve to bond respective components of the display device 100 to each other, and may be formed using an optically transparent display adhesive such as a pressure-sensitive adhesive, an optical clear adhesive (OCA), or an optical clear resin (OCR), but the present disclosure is not limited thereto.

The cover glass may protect components of the display device 100 from external impacts and prevent occurrence of damage such as scratches.

In one or more examples, the substrate SUB, the driving transistor Td, the light emitting element 120, the encapsulation layer ENCAP, and the plurality of first touch electrodes TE1 shown in FIG. 2 may illustrate an example configuration of the substrate SUB, the driving transistor DRT, the light emitting element ED, the encapsulation unit ENCAP, and the plurality of first touch electrodes TE1 shown in FIG. 1, respectively, or an example configuration of portions thereof, respectively.

Hereinafter, a more detailed description of the plurality of touch link lines TL is provided with reference to FIG. 4.

Figure 4:
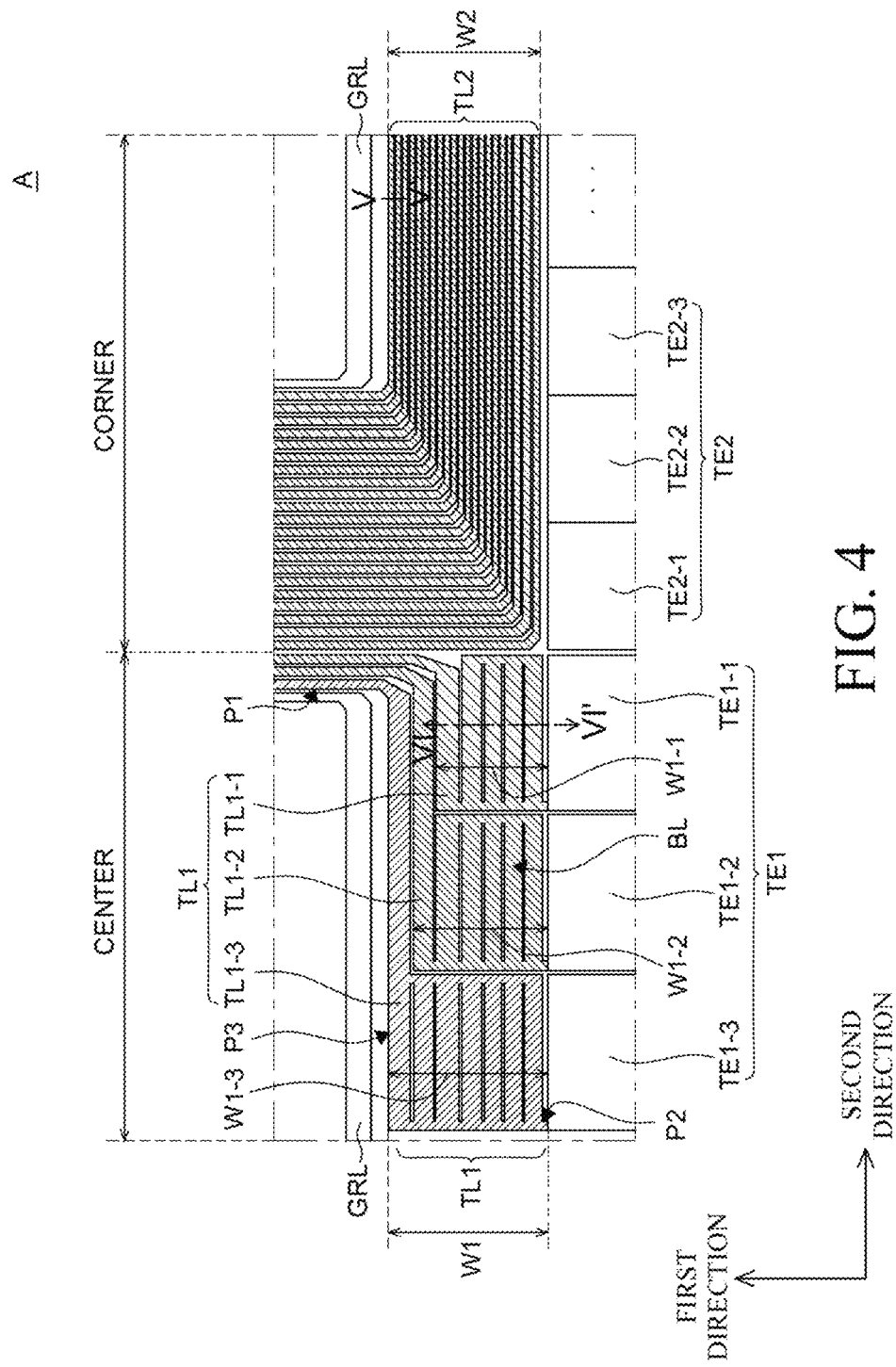
FIG. 4 is an enlarged schematic plan view of region A of FIG. 3 and a portion of the touch pads according to an example embodiment of the present disclosure.
Figure 5:
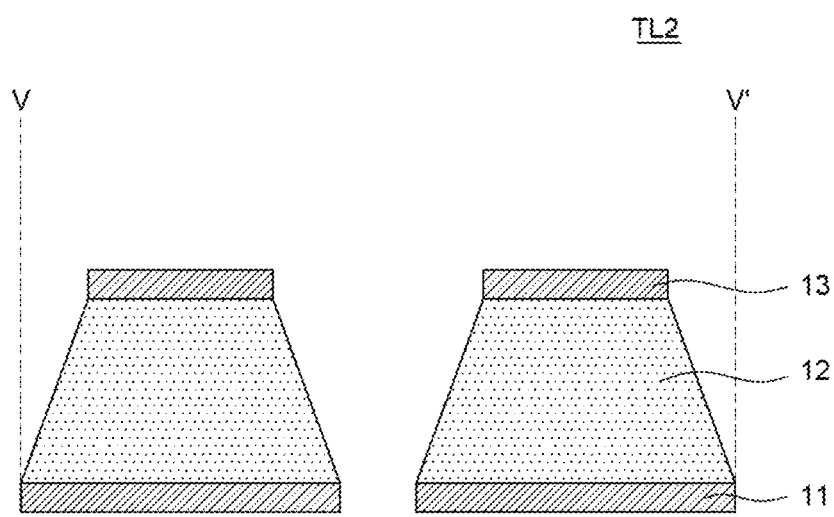
FIG. 5 is an example of a cross-sectional view taken along V-V' of FIG. 4.
Figure 6:
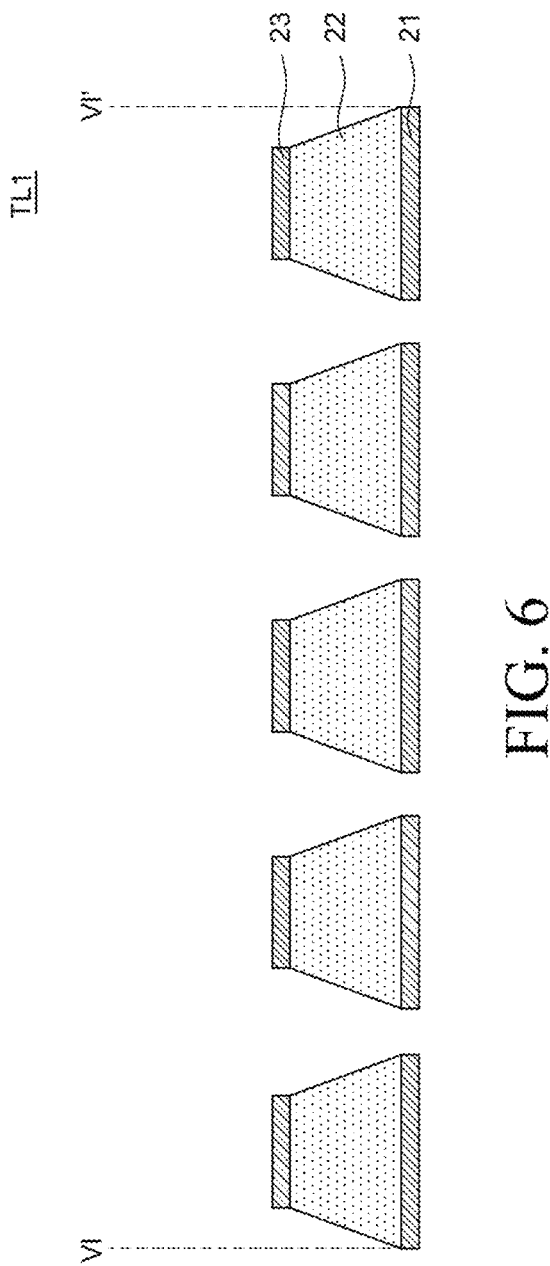
FIG. 6 is an example of a cross-sectional view taken along VI-VI' of FIG. 4

FIG. 4 is an enlarged schematic plan view of region A of FIG. 3 and a portion of the touch pads according to an example embodiment of the present disclosure. FIG. 5 is an example of a cross-sectional view taken along V-V' of FIG. 4. FIG. 6 is an example of a cross-sectional view taken along VI-VI' of FIG. 4.

FIG. 4 is an enlarged schematic plan view of the plurality of touch link lines TL disposed in the central portion CENTER and the corner portion CORNER of the non-active area NA according to an example embodiment of the present disclosure.

As illustrated in FIGS. 3 and 4, the plurality of first touch link lines TL1 disposed in the central portion CENTER of the non-active area NA may be respectively connected to the plurality of first touch electrodes TE disposed in the active area AA.

Meanwhile, the plurality of second touch link lines TL2 disposed in the corner portion CORNER of the non-active area NA may be respectively connected to the plurality of second touch electrodes TE2 disposed in the active area AA. However, as illustrated in FIG. 3, since the plurality of second touch electrodes TE2 and the plurality of second touch link lines TL2 may be connected at side surfaces of the plurality of second touch electrodes TE2, connections of the plurality of second touch electrodes TE2 and the plurality of second touch link lines TL2 are omitted.

Referring to FIG. 3 together therewith, a density of the plurality of touch link lines TL increases in an outer portion of the plurality of touch link lines TL disposed in the non-active area NA, that is, a density of the plurality of touch link lines TL increases from the central portion CENTER to the corner portion CORNER of the non-active area NA.

For example, when the densities of the plurality of touch link lines TL are different in the central portion CENTER and the corner portion CORNER of the non-active area NA, due to a difference side exposure area between the plurality of touch link lines TL caused by a difference in the densities, spots may be visually recognized in an area where the plurality of touch link lines TL are relatively dense, that is, in the corner portion CORNER of the non-active area NA.

Specifically, due to the difference in side exposure area between the metals constituting the plurality of touch link lines TL, spots may be visually recognized from the corner portion CORNER of the non-active area NA in which the plurality of touch link lines TL are relatively dense.

Referring to FIGS. 5 and 6 of the present disclosure, each of the plurality of first touch link lines TL1 and the plurality of second touch link lines TL2 according to an example embodiment of the present disclosure may have a multilayer structure in which metals having different reflectivities are stacked.

For example, each of the plurality of first touch link lines TL1 and the plurality of second touch link lines TL2 may include at least one of metals having strong corrosion resistance and acid resistance and excellent conductivity, such as titanium (Ti), aluminum (Al), and molybdenum (Mo).

For example, each of the plurality of second touch link lines TL2 may have a multilayer structure in which a first layer 11, a second layer 12, and a third layer 13 are stacked. Each of the plurality of first touch link lines TL1 may have a multilayer structure in which a first layer 21, a second layer 22, and a third layer 23 are stacked.

In this case, each of the plurality of first touch link lines TL1 and the plurality of second touch link lines TL2 may have the same shape, and each of the plurality of first touch link lines TL1 and the plurality of second touch link lines TL2 may have a multilayer structure in which titanium (Ti), aluminum (Al), and titanium (Ti) are sequentially stacked. When each of the plurality of first touch link lines TL1 and the plurality of second touch link lines TL2 have a stacked three-layer structure such as Ti/Al/Ti, its self-resistance and capacitance are reduced to decrease a resistance-capacitance (RC) delay, so that touch sensitivity can be improved.

According to an example embodiment of the present disclosure, cross-sectional shapes of the plurality of first touch link lines TL1 and the plurality of second touch link lines TL2 may have trapezoidal shapes.

Accordingly, when the densities of the plurality of touch link lines TL are different in the central portion CENTER and the corner portion CORNER of the non-active area NA, that is, when a width W1 in the first direction of an area where the plurality of first touch link lines TL1 disposed adjacent to the active area AA are disposed differs from a width W2 in the first direction of an area where the plurality of second touch link lines TL2 disposed adjacent to the active area AA are disposed, reflective visibility due to external light occurs in the corner portion CORNER of the non-active area NA where the plurality of touch link lines TL are relatively dense, due to a difference between areas where aluminum (Al) of the plurality of first touch link lines TL1 and aluminum (Al) of the plurality of second touch link lines TL2 are exposed from side surfaces thereof.

Such reflective visibility by external light may be visually recognized as spots by a user.

Therefore, in the display device 100 according to an example embodiment of the present disclosure, the width W1 in the first direction of the area where the plurality of first touch link lines TL1 disposed adjacent to the active area AA are disposed is configured to be equal to the width W2 in the first direction of the area where the plurality of second touch link lines TL2 disposed adjacent to the active area AA are disposed, so that the densities of the plurality of touch link lines TL in the central portion CENTER and the corner portion CORNER of the non-active area NA can be equalized.

Specifically, by connecting the plurality of first touch link lines TL1 having a relatively low density in parallel, the width W1 in the first direction of the area where the plurality of first touch link lines TL1 disposed adjacent to the active area AA are disposed may be configured to be equal to the width W2 in the first direction of the area where the plurality of second touch link lines TL2 disposed adjacent to the active area AA are disposed.

According to an example embodiment of the present disclosure, the plurality of respective first touch link lines TL1 may have the same thickness and different lengths.

For example, the plurality of first touch link lines TL1 may include first portions P1 connected to the plurality of touch pads PAD (e.g., at least some pads of the plurality of touch pads PAD, or a plurality of first touch pads PAD) and extending in the first direction, second portions P2 connected to the plurality of first touch electrodes and extending in the first direction, and third portions P3 connecting the first portions P1 and the second portions P2 and extending in the second direction. Each of the third portions P3 of at least parts (e.g., one or more first touch link lines TL1) of the plurality of first touch link lines TL1 may include a plurality of the branch lines BL connected in parallel. In one or more examples, there may be one or more gaps (e.g., non-conductive slits) between the plurality of branch lines BL, and the plurality of branch lines BL may be formed of one or more metals (e.g., titanium (Ti), aluminum (Al), and molybdenum (Mo)) and may be conductive.

In this case, the number of the plurality of branch lines BL included in the plurality of first touch link lines TL1 may be adjusted as necessary. For example, the number of the plurality of branch lines BL may increase as the third portions P3 of the plurality of first touch link lines TL1 are disposed closer to the central portion (or the central line CL) of the active area AA. In an example, being closer to the central portion (or the central line) of the active area may correspond to being farther away from the touch pad PD1-1.

Specifically, the number of the plurality of branch lines BL may increase as positions of the plurality of first touch electrodes TE1 to which the plurality of first touch link lines TL1 are connected are closer to the central portion CENTER (or the central line CL) of the non-active area of the substrate.

For example, referring to FIGS. 3 and 4, the plurality of first touch electrodes TE1 connected to the plurality of first touch link lines TL1 may include 1-1 touch electrodes TE1-1 (e.g., one or more first touch electrodes TE1 disposed at or near the boundary between the central portion CENTER and the corner portion CORNER), 1-2 touch electrodes TE1-2 (e.g., one or more other first touch electrodes TE1), and 1-3 touch electrodes TE1-3 (e.g., one or more yet other first touch electrodes TE1 disposed closer to the central line CL) in a direction toward the central portion CENTER (or the central line CL) from a boundary between the central portion CENTER and the corner portion CORNER. The first touch link lines TL1 (e.g., TL1-1, TL1-2 and TL1-3) may be respectively connected to the 1-1 touch electrodes TE1-1, the 1-2 touch electrodes TE1-2, and the 1-3 touch electrodes TE1-3. In this case, a length of one (e.g., TL1-1) of the first touch link lines TL1 connected to the 1-1 touch electrodes TE1-1 disposed at the boundary between the central portion CENTER and the corner portion CORNER may be the shortest, and a length of another one (e.g., TL1-3) of the first touch link lines TL1 connected to the 1-3 touch electrodes TE1-3 disposed close to the central portion CENTER of the non-active area of the substrate may be relatively long.

In this case, the number of the plurality of branch lines BL of the first touch link lines TL1 having a relatively long length is greater than the number of the plurality of branch lines BL of the first touch link lines TL1 having a relatively short length. Thus, without a difference in the width W1 of the plurality of first touch link lines TL1 in the first direction according to positions of the plurality of first touch electrodes TE1, the width W1 of the plurality of first touch link lines TL1 in the first direction may be configured equally.

In an example, a distance between the touch pad PD1-1 and the first touch electrode(s) TE1-1 (or the first touch electrode TE1-1 closest to the touch pad PD1-1) may be shorter than a distance between the touch pad PD1-1 and the first touch electrode(s) TE1-2 (or the first touch electrode TE1-2 closest to the touch pad PD1-1). Further, a distance between the touch pad PD1-1 and the first touch electrode(s) TE1-2 (or the first touch electrode TE1-2 closest to the touch pad PD1-1) may be shorter than a distance between the touch pad PD1-1 and the first touch electrode(s) TE1-3 (or the first touch electrode TE1-3 closest to the touch pad PD1-1). In other words, compared to the first touch electrode TE1-2, the first touch electrode TE1-1 may be closer to the touch pad PD1-1. Further, compared to the first touch electrode TE1-3, the first touch electrode TE1-2 may be closer to the touch pad PD1-1.

In an example, a distance between the touch pad PD1-1 and the first touch electrode(s) TE1-1 (or the first touch electrode TE1-1 closest to the touch pad PD1-1) may be shorter than a distance between the touch pad PD1-2 and the first touch electrode(s) TE1-2 (or the first touch electrode TE1-2 closest to the touch pad PD1-2). Further, a distance between the touch pad PD1-2 and the first touch electrode(s) TE1-2 (or the first touch electrode TE1-2 closest to the touch pad PD1-2) may be shorter than a distance between the touch pad PD1-3 and the first touch electrode(s) TE1-3 (or the first touch electrode TE1-3 closest to the touch pad PD1-3). In other words, compared to the distance between the first touch electrode TE1-2 and the touch pad PD1-2, the first touch electrode TE1-1 may be closer to the touch pad PD1-1. Further, compared to the distance between the first touch electrode TE1-3 and the touch pad PD1-3, the first touch electrode TE1-2 may be closer to the touch pad PD1-2.

In an example, a distance (or a pitch) between the touch pads PD1-1 and PD1-2 may be smaller than a distance (or a pitch) between the first touch electrodes TE1-1 and TE1-2. Similarly, a distance (or a pitch) between the touch pads PD1-2 and PD1-3 may be smaller than a distance (or a pitch) between the first touch electrodes TE1-2 and TE1-3.

In an example, compared with the 1-1 touch electrodes TE1-1, the 1-3 touch electrodes TE1-3 are disposed closer to the central portion CENTER (or the central line) of the non-active area of the substrate. Hence, in this example, the number of the plurality of branch lines BL of the first touch link line TL1-3 connected to the 1-3 touch electrodes TE1-3 is greater than the number of the plurality of branch lines BL of the first touch link line TL1-1 connected to the 1-1 touch electrodes TE1-1. In an example, being closer to the central portion CENTER (or the central line) of the substrate may correspond to being farther away from the touch pad PD1-1.

In an example, each of the third portions P3 of at least parts (e.g., one or more first touch link lines TL1; e.g., TL1-1, TL1-2 and/or TL1-3) of the plurality of first touch link lines TL1 includes a plurality of branch lines BL that are connected in parallel. In this example, one first touch link line TL1 (e.g., TL1-1) may be connected to the 1-1 touch electrodes TE1-1, another first touch link line TL1 (e.g., TL1-2) may be connected to the 1-2 touch electrodes TE1-2, and yet another first touch link line TL1 (e.g., TL1-3) may be connected to the 1-3 touch electrodes TE1-3. In this example, the number of the plurality of branch lines BL may increase as positions of the plurality of first touch electrodes (e.g., those first touch electrodes TE1 connected to the one or more touch link lines TL1) to which the at least parts of the plurality of first touch link lines TL1 are connected are closer to a central portion (or a central line) of the substrate. Stated in another way, the number of the plurality of branch lines BL may increase as positions of the plurality of first touch electrodes (e.g., TE1-1, TE1-2, and TE1-3, or some of them) to which the at least parts (e.g., TL1-1, TL1-2, and TL1-3, or some of them) of the plurality of first touch link lines TL1 are connected are closer to a central portion (or a central line) of the substrate. In an example, being closer to the central portion CENTER (or the central line) of the substrate may correspond to being farther away from the touch pad PD1-1.

According to an example embodiment of the present disclosure, since the width W1 in the first direction of the area where the plurality of first touch link lines TL1 disposed adjacent to the active area AA are disposed is equal to the width W2 in the first direction of the area where the plurality of second touch link lines TL2 disposed adjacent to the active area AA are disposed, it is possible to prevent occurrence of spots due to a difference in metal exposure area between the plurality of first touch link lines TL1 and the plurality of second touch link lines TL2.

In addition, lengths or shapes of the plurality of first touch link lines TL1 may be adjusted according to the positions of the plurality of first touch electrodes TE1 to which the plurality of first touch link lines TL1 are connected, so that resistance of each of the plurality of first touch link lines TL1 may be easily adjusted.

In one or more examples, the plurality of touch pads PAD may include a plurality of first touch pads PAD (e.g., PD1-1, PD1-2, and PD1-3). The first touch pads PD1-1, PD1-2 and PD1-3 may be disposed sequentially along a second direction (e.g., an X-axis direction).

In one or more examples, the plurality of first touch electrodes TE1 (e.g., TE1-1, TE1-2 and TE1-3) may be disposed sequentially along the second direction (e.g., an X-axis direction). For example, the first touch electrodes TE1-1, TE1-2 and TE1-3 may be disposed sequentially along the second direction (e.g., an X-axis direction). In one or more examples, the first touch electrodes TE1 (e.g., TE1-1, TE1-2 and TE1-3) may be disposed along the same direction as the first touch pads PAD (e.g., PD1-1, PD1-2, and PD1-3).

In an example, the first touch link line TL1-1 may connect the first touch pad PD1-1 and the first touch electrode(s) TE1-1. The first touch link line TL1-2 may connect the first touch pad PD1-2 and the first touch electrode(s) TE1-2. The first touch link line TL1-3 may connect the first touch pad PD1-3 and the first touch electrode(s) TE1-3.

Compared to the first touch electrode(s) TE1-2, the first touch electrode(s) TE1-1 may be closer to the first touch pad PD1-1. Compared to the first touch electrode(s) TE1-3, the first touch electrode(s) TE1-2 may be closer to the first touch pad PD1-1.

In an example, the first touch electrodes TE1-1 may correspond to one or more first touch electrodes TE1 connected via the bridge electrodes BE along one column (e.g., a first column along a Y-axis direction). The first touch electrode(s) TE1-2 may correspond to one or more first touch electrodes TE1 connected via the bridge electrodes BE along another column (e.g., a second column along a Y-axis direction). The first touch electrodes TE1-3 may correspond to one or more first touch electrodes TE1 connected via the bridge electrodes BE along yet another column (e.g., a third column along a Y-axis direction).

In this example, the first touch electrodes TE1-1, TE1-2 and TE1-3 may be disposed sequentially along the second direction (e.g., an X-axis direction), which is the same direction as the direction for the first touch pads PD1-1, PD1-2, and PD1-3. In an example, the first touch pads PD1-1, PD1-2 and PD1-3 are not electrically connected to one another along the second direction (e.g., an X-axis direction). In other words, the touch pad PD1-1 is not electrically connected to the touch pad PD1-2, and the touch pad PD1-2 is not electrically connected to the touch pad PD1-3. Similarly, in an example, the first touch electrodes TE1-1, TE1-2 and TE1-3 are not electrically connected to one another along the second direction (e.g., an X-axis direction). In other words, the first touch electrode TE1-1 is not electrically connected to the first touch electrode TE1-2, and the first touch electrode TE1-2 is not electrically connected to the first touch electrode TE1-3. The long dashes with dots (see FIGS. 4 and 7) indicate that each of the first portions P1 of the first touch link lines TL1-, TL1-2 and TL1-3 is connected to a corresponding one of the first touch pads PD1-1, PD1-2, and PD1-3.

Hereinafter, a display device according to another example embodiment of the present disclosure is described with reference to FIG. 7.

Figure 7:
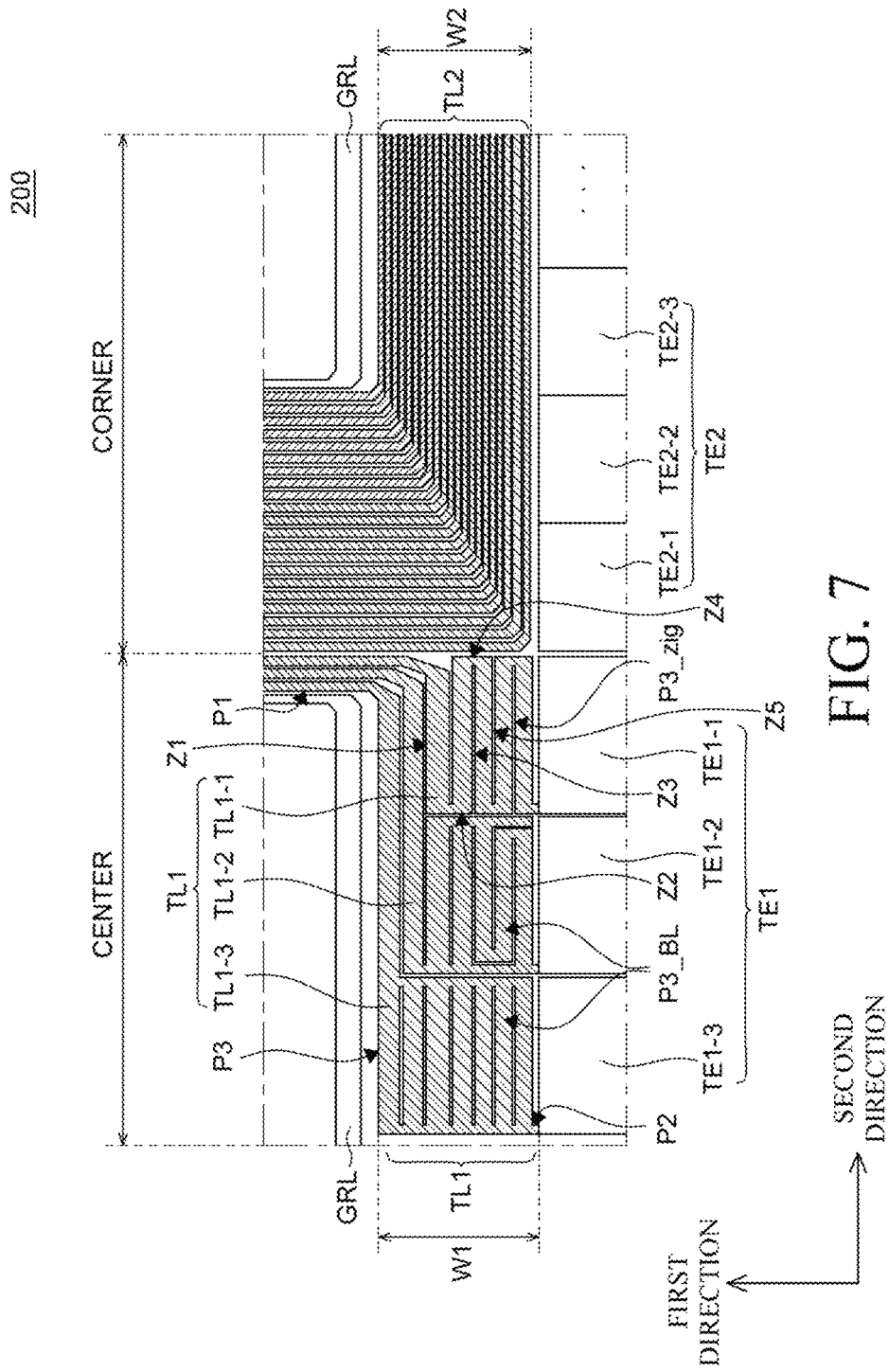
FIG. 7 is a schematic plan view of a display device according to another example embodiment of the present disclosure.

FIG. 7 is a schematic plan view of a display device including a portion of the touch pads according to another example embodiment of the present disclosure. The configurations of a display device of FIG. 7 are substantially identical to those of the display device 100 of FIGS. 1 to 5 except for the shapes and configurations of a plurality of first touch link lines TL1. Therefore, for convenience of description, redundant descriptions may be omitted.

Referring to FIG. 7, a display device 200 according to another example embodiment of the present disclosure includes the plurality of first touch link lines TL1. The plurality of first touch link lines TL1 include first portions P1 connected to the plurality of touch pads PAD (e.g., at least some pads (or one or more pads) of the plurality of touch pads PAD, or a plurality of first touch pads PAD) and extending in the first direction, second portions P2 connected to the plurality of first touch electrodes TE1 and extending in the first direction, and third portions P3 connecting the first portions P1 and the second portions P2. Each of the third portions P3 of parts (e.g., one or more first touch link lines TL1) of the plurality of first touch link lines TL1 may have a zigzag shape P3_zig, and each of the third portions P3 of the other parts (e.g., the one or more other first touch link lines TL1) of the plurality of first touch link lines TL1 may include a plurality of branch lines P3_BL connected in parallel.

In a display device according to another example embodiment of the present disclosure, a width W1 in a first direction of an area where the plurality of first touch link lines TL1 disposed adjacent to the active area AA are disposed may be configured to be equal to a width W2 in the first direction of an area where the plurality of second touch link lines TL2 disposed adjacent to the active area AA are disposed. However, in this case, the plurality of first touch link lines TL1 may respectively have different lengths.

In an example, each (e.g., TL1-1, TL1-2 or TL1-3) of the plurality of first touch link lines TL1 may include a corresponding first portion P1 connected to a corresponding one of the plurality of touch pads PAD (e.g., PD1-1, PD1-2 or PD1-3) and extending in the first direction, a corresponding second portion P2 connected to corresponding one or more first touch electrodes TE1 (e.g., TE1-1, TE1-2 or TE1-3) of the plurality of first touch electrodes TE1 and extending in the first direction, and a corresponding third portion P3 connecting the corresponding first portion P1 and the corresponding second portion P2. In an example, each third portion P3 of parts (e.g., one or more first touch link lines TL1; e.g., TL1-1 and/or TL1-2) of the plurality of first touch link lines TL1 may have a zigzag shape P3_zig. In an example, each third portion P3 of the other parts (e.g., the one or more other first touch link lines TL1; e.g., TL1-2 and/or TL1-3) of the plurality of first touch link lines TL1 may include a plurality of branch lines P3_BL connected in parallel. In an example, each third portion P3 of the other parts (e.g., the one or more other first touch link lines TL1; e.g., TL1-2 and/or TL1-3) of the plurality of first touch link lines TL1 does not include a zigzag shape P3_zig.

The plurality of first touch electrodes TE1 connected to the plurality of first touch link lines TL1 may include 1-1 touch electrodes TE1-1, 1-2 touch electrodes TE1-2, and 1-3 touch electrodes TE1-3 in a direction toward the central portion CENTER (or the central line CL) from a boundary between the central portion CENTER and the corner portion CORNER.

In an example, a distance between the touch pad PD1-1 and the first touch electrode(s) TE1-1 (or the first touch electrode TE1-1 closest to the touch pad PD1-1) may be shorter than a distance between the touch pad PD1-1 and the first touch electrode(s) TE1-2 (or the first touch electrode TE1-2 closest to the touch pad PD1-1). Further, a distance between the touch pad PD1-1 and the first touch electrode(s) TE1-2 (or the first touch electrode TE1-2 closest to the touch pad PD1-1) may be shorter than a distance between the touch pad PD1-1 and the first touch electrode(s) TE1-3 (or the first touch electrode TE1-3 closest to the touch pad PD1-1). In other words, compared to the first touch electrode TE1-2, the first touch electrode TE1-1 may be closer to the touch pad PD1-1. Further, compared to the first touch electrode TE1-3, the first touch electrode TE1-2 may be closer to the touch pad PD1-1.

In an example, a distance between the touch pad PD1-1 and the first touch electrode(s) TE1-1 may be shorter than a distance between the touch pad PD1-2 and the first touch electrode(s) TE1-2. Further, a distance between the touch pad PD1-2 and the first touch electrode(s) TE1-2 may be shorter than a distance between the touch pad PD1-3 and the first touch electrode(s) TE1-3. In other words, compared to the distance between the first touch electrode TE1-2 and the touch pad PD1-2, the first touch electrode TE1-1 may be closer to the touch pad PD1-1. Further, compared to the distance between the first touch electrode TE1-3 and the touch pad PD1-3, the first touch electrode TE1-2 may be closer to the touch pad PD1-2.

In an example, a distance (or a pitch) between the touch pads PD1-1 and PD1-2 may be smaller than a distance (or a pitch) between the first touch electrodes TE1-1 and TE1-2. Similarly, a distance (or a pitch) between the touch pads PD1-2 and PD1-3 may be smaller than a distance (or a pitch) between the first touch electrodes TE1-2 and TE1-3.

In this case, in the parts (e.g., the one or more first touch link lines TL1) of the plurality of first touch link lines TL1, that is, the first touch link line(s) TL1 (e.g., TL1-1 and/or TL1-2) connected to the first touch electrode(s) TE1 (e.g., the 1-1 touch electrodes TE1-1 and/or the 1-2 touch electrodes TE1-2), the corresponding third portion(s) P3 may be a single line(s) having a zigzag shape. The number of the plurality of branch lines BL of the third portions P3 of the other parts (e.g., TL1-2 and/or TL1-3) of the plurality of first touch link lines TL1 may increase as the positions of the plurality of first touch electrodes (e.g., TE1-2 and/or TE1-3) to which the other parts (e.g., TL1-2 and/or TL1-3) of the plurality of first touch link lines TL1 are connected are closer to the central portion CENTER (or the central line) of the substrate. In an example, being closer to the central portion CENTER (or the central line) of the substrate may correspond to being farther away from the touch pad PD1-1.

Referring to FIGS. 4 and 7, according to an example embodiment of the present disclosure, a width (see, e.g., W1-1, W1-2 and W1-3) in the first direction of an area where the third portions P3 are disposed may increase as the positions of the plurality of first touch electrodes TE1 to which the plurality of first touch link lines TL1 are connected are closer to the central portion CENTER of the substrate. For example, the third portion P3 of the first touch link line TL1-1 has a width W1-1, the third portion P3 of the first touch link line TL1-2 has a width W1-2, and the third portion P3 of the first touch link line TL1-3 has a width W1-3. Thus, in this example, a width (e.g., W1-1, W1-2 and W1-3) in the first direction of an area where the third portions P3 are disposed may increase as the positions of the first touch electrodes (e.g., TE1-1, TE1-2 and TE1-3) to which the first touch link lines (e.g., TL1-1, TL1-2 and TL1-3) are respectively connected become closer to the central portion CENTER (or the central line CL) of the substrate. In an example, being closer to the central portion CENTER (or the central line) of the substrate may correspond to being farther away from the touch pad PD1-1.

In an example, one or more parts (e.g., TL1-1) of the plurality of first touch link lines TL1 may be configured with a single line(s) having a zigzag shape, and the one or more other parts (e.g., TL1-3) of the plurality of first touch link lines TL1 may be configured to be connected in parallel or may be configured without a zigzag shape. Thus, resistance of the parts (e.g., TL1-1) of the plurality of first touch link lines TL1 may be increased, so that the plurality of respective first touch link lines TL may be formed to have equal resistance. Since occurrence of an RC delay deviation of touch signals can be prevented due to the plurality of first touch link lines TL1 formed to have equal resistance, touch performance can be improved.

Referring to FIG. 7, in one or more examples, the display device 200 may include a plurality of touch electrodes (e.g., TE1-1, TE1-2 and TE1-3) disposed in the active area and a plurality of touch pads (e.g., PD1-1, PD1-2 and PD1-3) disposed in the non-active area and electrically connected to the plurality of touch electrodes (e.g., TE1-1, TE1-2 and TE1-3, respectively). The display device 200 may also include a plurality of touch link lines (e.g., TL1-1, TL1-2 and TL1-3) respectively connecting the plurality of touch pads and the plurality of touch electrodes and disposed in the non-active area. The plurality of touch electrodes (e.g., TE1-1, TE1-2 and TE1-3) may be disposed sequentially along one direction (e.g., an X-axis direction). The plurality of touch pads (e.g., PD1-1, PD1-2 and PD1-3) may be also disposed sequentially along the one direction. At least a portion (e.g., at least a portion of P3) of at least one (e.g., TL1-1 and/or TL1-2) of the plurality of touch link lines may have a zigzag shape.

In one or more examples, the plurality of touch electrodes may include a first touch electrode (e.g., TE1-1) and a second touch electrode (e.g., TE1-2) disposed along the one direction (e.g., an X-axis direction); the plurality of touch pads may include a first touch pad (e.g., PD1-1) and a second touch pad (e.g., PD1-2) disposed along the one direction; the plurality of touch link lines may include a first touch link line (e.g., TL1-1) and a second touch link line (e.g., TL1-2); the first touch link line (e.g., TL1-1) may connect the first touch electrode (e.g., TE1-1) and the first touch pad (e.g., PD1-1); the second touch link line (e.g., TL1-2) may connect the second touch electrode (e.g., TE1-2) and the second touch pad (e.g., PD1-2); and compared to the second touch electrode (e.g., TE1-2), the first touch electrode (e.g., TE1-1) may be closer to the first touch pad (e.g., PD1-1).

In one or more examples, at least a portion (e.g., P3) of the first touch link line (e.g., TL1-1) may have the zigzag shape. In one or more examples, the second touch link line (e.g., TL1-2) does not have the zigzag shape. In one or more examples, at least a portion of the first touch link line may have a first width; at least a portion of the second touch link line may have a second width; and the second width may be greater than the first width. In one or more examples, a largest width of the second touch link may be greater than a largest width of the first touch link line.

In one or more examples, at least a portion (e.g., P3) of the first touch link line (e.g., TL1-1) may have a first zigzag shape; at least a portion (e.g., P3) of the second touch link line (e.g., TL1-2) may have a second zigzag shape; and the second zigzag shape may be different from the first zigzag shape.

In one or more examples, the plurality of touch electrodes may further include a third touch electrode (e.g., TE1-3) disposed along the one direction; the plurality of touch pads may further include a third touch pad (e.g., PD1-3) disposed along the one direction; the plurality of touch link lines may further include a third touch link line (e.g., TL1-3); the third touch link line may connect the third touch electrode and the third touch pad; and compared to the third touch electrode (e.g., TE1-3), the second touch electrode (e.g., TE1-2) may be closer to the first touch pad (e.g., PD1-1).

In one or more examples, at least a portion of the first touch link line (e.g., TL1-1) may have a first zigzag shape; at least a portion of the second touch link line (e.g., TL1-2) may have a second zigzag shape; the third touch link line (e.g., TL1-3) does not have a zigzag shape that includes portions overlapping with respect to another direction (e.g., a Y-axis direction); and the another direction may be different from the one direction (e.g., an X-axis direction).

In one or more examples, a largest width of the third touch link line may be greater than a largest width of the first touch link line. In an example, a width W1-3 of the first touch link line TL1-3 may be greater than a width of a first continuous segment Z1 of the first touch link line TL1-1.

In one or more examples, a resistance of the first touch link line (e.g., TL1-1) may be same as a resistance of the second touch link line (e.g., TL1-2). In one or more examples, a resistance of the first touch link line (e.g., TL1-1), a resistance of the second touch link line (e.g., TL1-2), and a resistance of the third touch link line (e.g., TL1-3) may be same.

In one or more examples, the zigzag shape may include a plurality of contiguous segments; and the plurality of contiguous segments may include: a first contiguous segment (e.g., Z1); a second contiguous segment (e.g., Z2) directly adjacent to the first contiguous segment; and a third contiguous segment (e.g., Z3) directly adjacent to the second contiguous segment. At least a portion of the first contiguous segment and at least a portion of the third contiguous segment may extend along the one direction (e.g., an X-axis direction) and overlap each other with respect to another direction (e.g., a Y-axis direction); and the another direction may be different from the one direction.

In one or more examples, at least a portion of the second contiguous segment (e.g., Z2) may extend along the another direction.

In one or more examples, the plurality of contiguous segments may further include: a fourth contiguous segment (e.g., Z4) directly adjacent to the third contiguous segment; and a fifth contiguous segment (e.g., Z5) directly adjacent to the fourth contiguous segment. The at least a portion of the third contiguous segment and at least a portion of the fifth contiguous segment may extend along the one direction and overlap each other with respect to the another direction.

In one or more examples, at least a portion of the second contiguous segment (e.g., Z2) may extend along the another direction; and at least a portion of the fourth contiguous segment (e.g., Z4) may extend along the another direction (e.g., a Y-axis direction).

In one or more examples, the zigzag shape may include a plurality of contiguous segments; and the plurality of contiguous segments may include: a first contiguous segment (e.g., Z1) extending along the one direction; a second contiguous segment (e.g., Z2) adjacent to the first contiguous segment and extending along another direction; and a third contiguous segment (e.g., Z3) adjacent to the second contiguous segment and extending along the one direction. The another direction (e.g., a Y-axis direction) may be different from the one direction (e.g., an X-axis direction).

In one or more examples, the first contiguous segment may be longer than the second contiguous segment; and the third contiguous segment may be longer than the second contiguous segment.

In one or more examples, the zigzag shape may include multiple bends (or turns or angles). For example, there may be a bend between the first and second contiguous segments, there may be a bend between the second and third contiguous segments, and so on. In one or more examples, the zigzag shape may include more than three bends. In one or more examples, the zigzag shape may include more than five bends. In one or more examples, a bend may be more than 0 degrees. In one or more examples, a bend may be about 90 degrees. In one or more examples, a bend may be less than 180 degrees. In one or more examples, a bend may be more than 10 degrees and less than 170 degrees. In one or more examples, a bend may be more than 20 degrees and less than 160 degrees. In one or more examples, a bend may be more than 30 degrees and less than 150 degrees. In one or more examples, a bend may be more than 40 degrees and less than 140 degrees. In one or more examples, a bend may be more than 50 degrees and less than 130 degrees. In one or more examples, a bend may be more than 50 degrees and less than 120 degrees.

Referring to FIGS. 3, 4 and 7, in one or more examples, the touch sensing unit (or touch sensing structure) may include a plurality of first touch electrodes (e.g., TE1) disposed along the one direction in the active area; the plurality of first touch electrodes may include the plurality of touch electrodes; the touch sensing unit (or structure) may further include a plurality of second touch electrodes (e.g., TE2) disposed along another direction (e.g., a Y-axis direction) in the active area; the another direction may cross the one direction (e.g., an X-axis direction); a plurality of first touch pads may include the plurality of touch pads and may be disposed in the non-active area; a plurality of second touch pads may be disposed in the non-active area and configured for electrical connection to the plurality of second touch electrodes; a plurality of first touch link lines (e.g., TL1) may include the plurality of touch link lines and may be disposed in a central portion of the non-active area; the plurality of first touch link lines may connect the plurality of first touch pads and the plurality of first touch electrodes; a plurality of second touch link lines (e.g., TL2) may be disposed in a corner portion of the non-active area; the plurality of second touch link lines may connect the plurality of second touch pads and the plurality of second touch electrodes; a width (e.g., W1) in the another direction of an area where the plurality of first touch link lines disposed adjacent to the active area may be disposed may be equal to a width (e.g., W2) in the another direction of an area where the plurality of second touch link lines disposed adjacent to the active area may be disposed; the another direction may correspond to a first direction; and the one direction may correspond to a second direction.

Referring to FIGS. 4 and 7, in one or more examples, the area for the width W1 may include the plurality of branch lines BL connected in parallel, and the area for the width W2 may exclude a plurality of branch lines connected in parallel. Further, in one or more examples, there may be a smaller number of touch link lines in the area for the width W1 as compared to the area for the width W2. Stated in another way, in an example, the number of the first touch link lines TL1 in the area for the width W1 may be less than the number of the second touch link lines TL2 in the area for the width W2.

It should be noted that while FIGS. 4 and 7 show the plurality of first touch link lines TL1 having three first touch link lines TL1 (e.g., TL1-1, TL1-2 and TL1-3), the plurality of first touch link lines TL1 may have other first touch link lines that are not shown. Accordingly, there may be other first touch link line(s) having the same or similar configuration as the configuration of the first touch link line TL1-1, there may be other first touch link line(s) having the same or similar configuration as the configuration of the first touch link line TL1-2, and there may be other first touch link line(s) having the same or similar configuration as the configuration of the first touch link line TL1-3.

In one or more aspects of this present disclosure, for the phrases such as "closer to a central portion," "closer to the central portion," "close to a central portion," "close to the central portion," "from the central portion," "toward the central portion," and the like, the term "central portion" may represent, for example, a central line CL (see FIG. 3) passing through the middle of the substrate (or the middle of the non-active area NA or the middle of the active area AA) along the first direction. In an example, being closer to the central portion (or the central line) of the substrate (or the non-active area or the active area) may correspond to being farther away from the touch pad PD1-1.

In one or more aspects, an encapsulation unit may refer to an encapsulation element, an encapsulation layer, an encapsulation structure, an encapsulation arrangement, or an encapsulation formation. In one or more aspects, a touch sensing unit may refer to a touch sensing element, a touch sensor, a touch sensing structure, a touch sensing arrangement, or a touch sensing formation. A unit, a layer, an element, a structure, an arrangement, a formation, and a sensor may include one or more units, one or more layers, one or more elements, one or more structures, one or more arrangements, one or more formations, and one or more sensors, respectively.

Various example embodiments and aspects of the present disclosure are described below. These are provided as examples, and do not limit the scope of the present disclosure.

According to one or more aspects of the present disclosure, a display device may include: a substrate; an active area and a non-active area; a plurality of light emitting elements disposed in the active area; an encapsulation structure disposed to cover the plurality of light emitting elements; a touch sensing structure, wherein at least a portion of the touch sensing structure may be disposed on the encapsulation structure, and wherein the touch sensing structure may include a plurality of touch electrodes; a plurality of touch pads disposed in the non-active area and configured for electrical connection to the plurality of touch electrodes; and a plurality of touch link lines connecting the plurality of touch pads and the plurality of touch electrodes and disposed in the non-active area, wherein the plurality of touch electrodes may be disposed along one direction, the plurality of touch pads may be disposed along the one direction, and at least a portion of at least one of the plurality of touch link lines may have a zigzag shape.

In one or more examples, the plurality of touch electrodes may include a first touch electrode and a second touch electrode disposed along the one direction; the plurality of touch pads may include a first touch pad and a second touch pad disposed along the one direction; the plurality of touch link lines may include a first touch link line and a second touch link line; the first touch link line may connect the first touch electrode and the first touch pad; the second touch link line may connect the second touch electrode and the second touch pad; and compared to the second touch electrode, the first touch electrode may be closer to the first touch pad.

In one or more examples, at least a portion of the first touch link line may have the zigzag shape; and the second touch link line does not have the zigzag shape.

In one or more examples, at least a portion of the first touch link line may have a zigzag shape; the at least a portion of the first touch link line may have a first width; at least a portion of the second touch link line may have a second width; and the second width may be greater than the first width.

In one or more examples, at least a portion of the first touch link line may have a zigzag shape; and a largest width of the second touch link may be greater than a largest width of the first touch link line.

In one or more examples, at least a portion of the first touch link line may have a first zigzag shape; at least a portion of the second touch link line may have a second zigzag shape; and the second zigzag shape may be different from the first zigzag shape.

In one or more examples, the plurality of touch electrodes may further include a third touch electrode disposed along the one direction; the plurality of touch pads may further include a third touch pad disposed along the one direction; the plurality of touch link lines may further include a third touch link line; the third touch link line may connect the third touch electrode and the third touch pad; and compared to the third touch electrode, the second touch electrode may be closer to the first touch pad.

In one or more examples, at least a portion of the first touch link line may have a first zigzag shape; at least a portion of the second touch link line may have a second zigzag shape; the third touch link line does not have a zigzag shape that includes portions overlapping with respect to another direction; and the another direction may be different from the one direction.

In one or more examples, a largest width of the third touch link line may be greater than a largest width of the first touch link line.

In one or more examples, a resistance of the first touch link line may be same as a resistance of the second touch link line.

In one or more examples, a resistance of the first touch link line, a resistance of the second touch link line, and a resistance of the third touch link line may be same.

In one or more examples, the zigzag shape may include a plurality of contiguous segments; and the plurality of contiguous segments may include: a first contiguous segment; a second contiguous segment directly adjacent to the first contiguous segment; and a third contiguous segment directly adjacent to the second contiguous segment. At least a portion of the first contiguous segment and at least a portion of the third contiguous segment may extend along the one direction and overlap each other with respect to another direction; and the another direction may be different from the one direction.

In one or more examples, at least a portion of the second contiguous segment may extend along the another direction.

In one or more examples, the plurality of contiguous segments may further include: a fourth contiguous segment directly adjacent to the third contiguous segment; and a fifth contiguous segment directly adjacent to the fourth contiguous segment. The at least a portion of the third contiguous segment and at least a portion of the fifth contiguous segment may extend along the one direction and overlap each other with respect to the another direction.

In one or more examples, at least a portion of the second contiguous segment may extend along the another direction; and at least a portion of the fourth contiguous segment may extend along the another direction.

In one or more examples, the zigzag shape may include a plurality of contiguous segments; and the plurality of contiguous segments may include: a first contiguous segment extending along the one direction; a second contiguous segment adjacent to the first contiguous segment and extending along another direction; and a third contiguous segment adjacent to the second contiguous segment and extending along the one direction. The another direction may be different from the one direction.

In one or more examples, the first contiguous segment may be longer than the second contiguous segment; and the third contiguous segment may be longer than the second contiguous segment.

In one or more examples, the zigzag shape may include multiple bends. In one or more examples, the zigzag shape may include more than three bends. In one or more examples, the zigzag shape may include more than five bends.

In one or more examples, the touch sensing structure may include a plurality of first touch electrodes disposed along the one direction in the active area; the plurality of first touch electrodes may include the plurality of touch electrodes; the touch sensing structure may further include a plurality of second touch electrodes disposed along another direction in the active area; the another direction may cross the one direction; a plurality of first touch pads may include the plurality of touch pads and may be disposed in the non-active area; a plurality of second touch pads may be disposed in the non-active area and configured for electrical connection to the plurality of second touch electrodes; a plurality of first touch link lines may include the plurality of touch link lines and may be disposed in a central portion of the non-active area; the plurality of first touch link lines may connect the plurality of first touch pads and the plurality of first touch electrodes; a plurality of second touch link lines may be disposed in a corner portion of the non-active area; the plurality of second touch link lines may connect the plurality of second touch pads and the plurality of second touch electrodes; a width in the another direction of an area where the plurality of first touch link lines disposed adjacent to the active area may be disposed may be equal to a width in the another direction of an area where the plurality of second touch link lines disposed adjacent to the active area may be disposed; the another direction may correspond to a first direction; and the one direction may correspond to a second direction.

In one or more examples, at least some of the plurality of respective first touch link lines may have the same thickness and different lengths.

In one or more examples, the plurality of first touch link lines may include first portions respectively connected to the plurality of first touch pads and extending in the first direction, second portions respectively connected to the plurality of first touch electrodes and extending in the first direction, and third portions respectively connecting the first portions and the second portions and extending in the second direction. Each of the third portions of at least one or more parts of the plurality of first touch link lines may include a plurality of branch lines connected in parallel.

In one or more examples, the number of the plurality of branch lines may increase as the third portions of the at least one or more parts of the plurality of first touch link lines are disposed closer to a central line of the active area.

In one or more examples, the number of the plurality of branch lines may increase as positions of the plurality of first touch electrodes to which the at least one or more parts of the plurality of first touch link lines are connected are closer to a central line of the substrate.

In one or more examples, the plurality of first touch link lines include first portions respectively connected to the plurality of first touch pads and extending in the first direction, second portions respectively connected to the plurality of first touch electrodes and extending in the first direction, and third portions respectively connecting the first portions and the second portions. Each of the third portions of one or more parts of the plurality of first touch link lines may have a zigzag shape, and each of the third portions of one or more other parts of the plurality of first touch link lines may include a plurality of branch lines connected in parallel.

In one or more examples, the third portions of the one or more parts of the plurality of first touch link lines may be single lines having a zigzag shape.

In one or more examples, the number of the plurality of branch lines of the third portions of the one or more other parts of the plurality of first touch link lines may increase as positions of the plurality of first touch electrodes to which the one or more other parts of the plurality of first touch link lines are connected are closer to a central line of the substrate.

In one or more examples, a width in the first direction of an area where the third portions of the one or more parts and of the one or more other parts are disposed may increase as positions of the plurality of first touch electrodes to which the plurality of first touch link lines are connected are closer to a central line of the substrate.

In one or more examples, the plurality of first touch link lines and the plurality of second touch link lines may have a multilayer structure in which metals having different reflectivities are stacked.

In one or more examples, cross-sectional shapes of the plurality of first touch link lines and the plurality of second touch link lines may have trapezoidal shapes.

With respect to the plurality of first touch link lines, the area for the width may include the plurality of branch lines connected in parallel. With respect to the plurality of second touch link lines, the area for the width may exclude, or does not contain, a plurality of branch lines connected in parallel.

Although the example embodiments of the present disclosure have been described in detail with reference to the accompanying drawings, the present disclosure is not limited thereto and may be embodied in many different forms without departing from the technical concept of the present disclosure. For example, FIG. 1 to FIG. 7 and the associated descriptions provide examples, and the present disclosure is not limited thereto. Therefore, the example embodiments of the present disclosure are provided for illustrative purposes only and not intended to limit the technical concept or scope of the present disclosure. The scope of the technical concept of the present disclosure is not limited thereto. Therefore, it should be understood that the above-described example embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device, comprising:
   a substrate;
   an active area and a non-active area;
   a plurality of light emitting elements disposed in the active area;
   an encapsulation structure disposed to cover the plurality of light emitting elements;
   a touch sensing structure, wherein at least a portion of the touch sensing structure is disposed on the encapsulation structure, and wherein the touch sensing structure includes a plurality of touch electrodes;

a plurality of touch pads disposed in the non-active area and configured for electrical connection to the plurality of touch electrodes; and
a plurality of touch link lines connecting the plurality of touch pads and the plurality of touch electrodes and disposed in the non-active area,
wherein:
the plurality of touch electrodes are disposed along one direction;
the plurality of touch pads are disposed along the one direction;
the plurality of touch link lines includes first touch link lines and second touch link lines;
at least a portion of at least one first touch link line among the first touch link lines includes a zigzag shape;
the first touch link lines include a region of a first width in another direction different from the one direction in a region corresponding to a region where the zigzag shape is arranged;
the second touch link lines include a region of a second width with respect to the another direction;
the region of the first touch link lines having the first width and the region of the second touch link lines having the second width are arranged side by side with respect to the one direction;
the region of the first width and the region of the second width are arranged between a ground line and the plurality of touch electrodes in the another direction;
the second touch link lines arranged in the region of the second width extend in the one direction; and
the number of the first touch link lines arranged in the region of the first width is less than the number of the second touch link lines arranged in the region of the second width.

2. The display device of claim 1, wherein:
the plurality of touch electrodes comprise a first touch electrode and a second touch electrode disposed along the one direction;
the plurality of touch pads comprise a first touch pad and a second touch pad disposed along the one direction;
the at least one first touch link line comprises a first touch link line;
the second touch link lines comprise a second touch link line;
the first touch link line connects the first touch electrode and the first touch pad;
the second touch link line connects the second touch electrode and the second touch pad; and
compared to the second touch electrode, the first touch electrode is closer to the first touch pad.

3. The display device of claim 2, wherein:
the second touch link line does not have the zigzag shape.

4. The display device of claim 3, wherein a resistance of the first touch link line is same as a resistance of the second touch link line.

5. The display device of claim 2, wherein:
the second width is greater than the first width.

6. The display device of claim 2, wherein:
a largest width of the second touch link line is greater than a largest width of the first touch link line.

7. The display device of claim 2, wherein:
at least a portion of the second touch link line has a second zigzag shape; and
the second zigzag shape is different from the zigzag shape.

8. The display device of claim 2, wherein:
the plurality of touch electrodes further comprise a third touch electrode disposed along the one direction;
the plurality of touch pads further comprise a third touch pad disposed along the one direction;
the plurality of touch link lines further comprise a third touch link line;
the third touch link line connects the third touch electrode and the third touch pad; and
compared to the third touch electrode, the second touch electrode is closer to the first touch pad.

9. The display device of claim 8, wherein:
the third touch link line does not have a zigzag shape that includes portions overlapping with respect to the another direction; and
the another direction is different from the one direction.

10. The display device of claim 8, wherein:
a largest width of the third touch link line is greater than a largest width of the first touch link line.

11. The display device of claim 8, wherein a resistance of the first touch link line, a resistance of the second touch link line, and a resistance of the third touch link line are same.

12. The display device of claim 2, wherein a resistance of the first touch link line is same as a resistance of the second touch link line.

13. The display device of claim 1, wherein:
the zigzag shape includes a plurality of contiguous segments;
the plurality of contiguous segments include:
a first contiguous segment;
a second contiguous segment directly adjacent to the first contiguous segment; and
a third contiguous segment directly adjacent to the second contiguous segment;
at least a portion of the first contiguous segment and at least a portion of the third contiguous segment extend along the one direction and overlap each other with respect to the another direction; and
the another direction is different from the one direction.

14. The display device of claim 13, wherein:
at least a portion of the second contiguous segment extends along the another direction.

15. The display device of claim 13, wherein:
the plurality of contiguous segments further include:
a fourth contiguous segment directly adjacent to the third contiguous segment; and
a fifth contiguous segment directly adjacent to the fourth contiguous segment; and
the at least a portion of the third contiguous segment and at least a portion of the fifth contiguous segment extend along the one direction and overlap each other with respect to the another direction.

16. The display device of claim 15, wherein:
at least a portion of the second contiguous segment extends along the another direction; and
at least a portion of the fourth contiguous segment extends along the another direction.

17. The display device of claim 1, wherein:
the zigzag shape includes a plurality of contiguous segments;
the plurality of contiguous segments include:
a first contiguous segment extending along the one direction;
a second contiguous segment adjacent to the first contiguous segment and extending along the another direction; and a third contiguous segment adjacent to the second contiguous segment and extending along the one direction; and the another direction is different from the one direction.

18. The display device of claim 17, wherein:
the first contiguous segment is longer than the second contiguous segment; and
the third contiguous segment is longer than the second contiguous segment.

19. The display device of claim 1, wherein the zigzag shape includes multiple bends.

20. The display device of claim 19, wherein the zigzag shape includes more than three bends.

21. The display device of claim 1, wherein:
the touch sensing structure includes a plurality of first touch electrodes disposed along the one direction in the active area;
the plurality of first touch electrodes comprise the plurality of touch electrodes;
the touch sensing structure further includes a plurality of second touch electrodes disposed along the another direction in the active area;
the another direction crosses the one direction;
a plurality of first touch pads comprise the plurality of touch pads and are disposed in the non-active area;
a plurality of second touch pads are disposed in the non-active area and configured for electrical connection to the plurality of second touch electrodes;
a plurality of first touch link lines comprise the first touch link lines and are disposed in a central portion of the non-active area;
the plurality of first touch link lines connect the plurality of first touch pads and the plurality of first touch electrodes;
a plurality of second touch link lines are disposed in a corner portion of the non-active area;
the plurality of second touch link lines connect the plurality of second touch pads and the plurality of second touch electrodes;
a width in the another direction of an area where the plurality of first touch link lines disposed adjacent to the active area are disposed is equal to a width in the another direction of an area where the plurality of second touch link lines disposed adjacent to the active area are disposed;
the another direction corresponds to a first direction; and
the one direction corresponds to a second direction.

22. The display device of claim 21, wherein at least some of the plurality of respective first touch link lines have a same thickness and different lengths.

23. The display device of claim 21, wherein the plurality of first touch link lines include:
first portions respectively connected to the plurality of first touch pads and extending in the first direction;
second portions respectively connected to the plurality of first touch electrodes and extending in the first direction; and
third portions respectively connecting the first portions and the second portions and extending in the second direction,
wherein each of the third portions of at least one or more parts of the plurality of first touch link lines includes a plurality of branch lines connected in parallel.

24. The display device of claim 23, wherein the number of the plurality of branch lines increases as the third portions of the at least one or more parts of the plurality of first touch link lines are disposed closer to a central line of the active area.

25. The display device of claim 23, wherein the number of the plurality of branch lines increases as positions of the plurality of first touch electrodes to which the at least one or more parts of the plurality of first touch link lines are connected are closer to a central line of the substrate.

26. The display device of claim 23, wherein with respect to the plurality of first touch link lines, the area for the width includes the plurality of branch lines connected in parallel.

27. The display device of claim 26, wherein with respect to the plurality of second touch link lines, the area for the width does not contain a plurality of branch lines connected in parallel.

28. The display device of claim 21, wherein the plurality of first touch link lines include:
first portions respectively connected to the plurality of first touch pads and extending in the first direction;
second portions respectively connected to the plurality of first touch electrodes and extending in the first direction; and
third portions respectively connecting the first portions and the second portions,
wherein each of the third portions of one or more parts of the plurality of first touch link lines has a zigzag shape, and each of the third portions of one or more other parts of the plurality of first touch link lines includes a plurality of branch lines connected in parallel.

29. The display device of claim 28, wherein the third portions of the one or more parts of the plurality of first touch link lines are single lines having a zigzag shape.

30. The display device of claim 28, wherein the number of the plurality of branch lines of the third portions of the one or more other parts of the plurality of first touch link lines increases as positions of the plurality of first touch electrodes to which the one or more other parts of the plurality of first touch link lines are connected are closer to a central line of the substrate.

31. The display device of claim 28, wherein a width in the first direction of an area where the third portions of the one or more parts and of the one or more other parts are disposed increases as positions of the plurality of first touch electrodes to which the plurality of first touch link lines are connected are closer to a central line of the substrate.

32. The display device of claim 21, wherein the plurality of first touch link lines and the plurality of second touch link lines have a multilayer structure in which metals having different reflectivities are stacked.

33. The display device of claim 32, wherein cross-sectional shapes of the plurality of first touch link lines and the plurality of second touch link lines have trapezoidal shapes.

* * * * *